(12) United States Patent
Li et al.

(10) Patent No.: US 10,241,275 B2
(45) Date of Patent: Mar. 26, 2019

(54) OPTICAL FIBER CONNECTOR FERRULE ASSEMBLY HAVING DUAL REFLECTIVE SURFACES FOR BEAM EXPANSION AND EXPANDED BEAM CONNECTOR INCORPORATING SAME

(71) Applicant: NANOPRECISION PRODUCTS, INC., El Segundo, CA (US)

(72) Inventors: Shuhe Li, Pasadena, CA (US); Robert Ryan Vallance, Newbury Park, CA (US); Rand D. Dannenberg, Newbury Park, CA (US); Matthew Gean, Camarillo, CA (US); Gregory L. Klotz, La Verne, CA (US)

(73) Assignee: NANOPRECISION PRODUCTS, INC., Camarillo, CA (US)

( * ) Notice: Subject to any disclaimer, the term of this patent is extended or adjusted under 35 U.S.C. 154(b) by 0 days.

(21) Appl. No.: 15/680,204

(22) Filed: Aug. 17, 2017

(65) Prior Publication Data
US 2018/0081123 A1     Mar. 22, 2018

Related U.S. Application Data

(60) Provisional application No. 62/376,381, filed on Aug. 17, 2016.

(51) Int. Cl.
*G02B 6/38*     (2006.01)
*G02B 6/42*     (2006.01)
*G02B 6/44*     (2006.01)

(52) U.S. Cl.
CPC ............ *G02B 6/3818* (2013.01); *G02B 6/383* (2013.01); *G02B 6/3839* (2013.01);
(Continued)

(58) Field of Classification Search
CPC .. G02B 6/3818; G02B 6/3885; G02B 6/3893; G02B 6/4403; G02B 6/3874; G02B 6/3887
See application file for complete search history.

(56) References Cited

U.S. PATENT DOCUMENTS

| 9,465,170 B1 * | 10/2016 | Childers | ............. G02B 6/3853 |
| 2002/0064191 A1 * | 5/2002 | Capewell | ........... G02B 6/29367 372/14 |

(Continued)

OTHER PUBLICATIONS

International Search Report of Counterpart PCT International Application No. PCT/US2017/047461.

*Primary Examiner* — John Bedtelyon
(74) *Attorney, Agent, or Firm* — Liu & Liu

(57) ABSTRACT

An expanded beam ferrule includes a first ferrule halve having first reflective surfaces and a second ferrule halve having second reflective surfaces, which together retain optical fibers. The pair of reflective surfaces output collimated light parallel to the mid-plane of the ferrule. An external sleeve aligns the external surface of two similar ferrules, with corresponding second reflective surfaces of the ferrules facing each other. Output light from an optical fiber held in one ferrule is bent twice by the pair of reflective surfaces, with beam divergence after the first bent, and collimation after the second bent. The collimated light is transmitted to the facing second reflective surface in a facing second ferrule aligned by the sleeve, which is subject to optical reshaping in reverse to that undertaken in the first ferrule, so as to converge and focus light to input to the optical fiber held in the other ferrule.

10 Claims, 21 Drawing Sheets

(52) U.S. Cl.
CPC ......... *G02B 6/3849* (2013.01); *G02B 6/3874* (2013.01); *G02B 6/3885* (2013.01); *G02B 6/3887* (2013.01); *G02B 6/3893* (2013.01); *G02B 6/4214* (2013.01); *G02B 6/4403* (2013.01); *G02B 6/3865* (2013.01)

(56) References Cited

U.S. PATENT DOCUMENTS

| | | | |
|---|---|---|---|
| 2003/0219203 A1* | 11/2003 | Zhou | G02B 6/327 385/33 |
| 2010/0284651 A1 | 11/2010 | Krähenbühl et al. | |
| 2015/0050019 A1 | 2/2015 | Sengupta | |
| 2016/0025929 A1 | 1/2016 | Mei et al. | |
| 2016/0341909 A1* | 11/2016 | Childers | G02B 6/3853 |

* cited by examiner

OPTICAL FIBER CONNECTOR FERRULE ASSEMBLY HAVING DUAL REFLECTIVE SURFACES FOR BEAM EXPANSION AND EXPANDED BEAM CONNECTOR INCORPORATING SAME

PRIORITY CLAIM

This application claims the priority of U.S. Provisional Patent Application No. 62/376,381 filed on Aug. 17, 2016, which is fully incorporated by reference as if fully set forth herein. All publications noted below are fully incorporated by reference as if fully set forth herein.

GOVERNMENT RIGHTS

This invention was made with government support under Contract No. DE-SC0009617 awarded by DEPARTMENT OF ENERGY. The government has certain rights in the invention.

BACKGROUND OF THE INVENTION

1. Field of the Invention

The present invention relates to optical beam expanded beam connectors, in particular ferrule assemblies in expanded beam connectors.

2. Description of Related Art

There are many advantages of transmitting light signal via optical fiber waveguides and the use thereof is diverse. Single or multiple fiber waveguides may be used simply for transmitting visible light to a remote location. Complex telephony and data communication systems may transmit digitized data through optical signals within the waveguides. These applications couple fibers in an end-to-end relationship, with the coupling being one source of light loss. Precision alignment of two polished ends of fibers is needed to ensure that optical loss in a fiber link is less than the specified optical loss budget for a system. For single-mode telecommunication-grade fiber, this typically corresponds to connector fiber alignment tolerances that are less than 1000 nm. This means that in both parallel fiber and single fiber links, operating at multi-gigabit rates, the components applied to align the fibers must be assembled and fabricated with sub-micron precision.

In an optical fiber connection, an optical fiber connector terminates the end of a cable that contains one or multiple fibers, and enables quicker connection and disconnection as compared to splicing. The connectors mechanically couple and align the cores of fibers so that light can pass end-to-end. The end of an optical fiber is supported in a ferrule, with an end face of the optical fiber positioned generally flush with or slightly protruding from an end face of the ferrule. When complementary ferrules in connector assemblies are mated, the optical fiber of one ferrule is aligned with a mating optical fiber of the other ferrule. Better connectors lose very little light due to reflection or misalignment of the fibers. Connectors, in both parallel/multiple fiber and single fiber links, operating at multi-gigabit rates must be assembled with subcomponents fabricated with sub micron precision. As if producing parts with such precision levels were not challenging enough, for the resulting end products to be economical it must be done in an automated, high-speed process.

In some applications, the end faces of mating optical fibers physically contact one another to effect signal transmission between the mating optical fiber pair. In such applications, various factors may reduce the efficiency of light transmission between the optical fiber pair, such as irregularities, burrs or scratches in the fiber end faces, misalignment of the optical fiber pair, as well as dust or debris between the optical fibers at the mating interface. Due to the small optical path relative to the size of any foreign objects such as dust or debris, any such foreign objects will interfere with the transmission of light.

Heretofore, prior art expanded beam connectors have been developed to expand the size of the optical beam and transmit the beam through an air gap between the connectors. By expanding the beam, the relative size difference between the dust or debris and the beam is increased which thus reduces the impact of any dust or debris as well as any misalignment on the efficiency of the light transmission. As a result, expanded beam optical fiber connectors are often preferable in relatively dirty and high vibration environments.

Heretofore, prior art expanded beam connectors include a lens mounted adjacent an end face of each optical fiber. Two types of lenses are commonly used—collimating and cross-focusing. A collimating lens receives light output from a first optical fiber and expands the beam to a relatively large diameter. When using a collimating lens, a second lens and ferrule assembly is similarly configured with a collimating lens positioned adjacent the end face of a second optical fiber for receiving the expanded beam, and refocuses the beam at the input end face of the second optical fiber. A cross-focusing lens receives the light from a first optical fiber, expands it to a relatively large diameter and then focuses the light from the relatively large diameter at a specific focal point. With cross-focusing lenses, the lens and ferrule assembly may be mated with either another lens and ferrule assembly having a cross-focusing lens or with a non-lensed ferrule assembly as is known in the art.

Currently, it is generally accepted that prior art optical fiber connectors cost too much to manufacture and the reliability and loss characteristics are more to be desired. The lens in an expanded beam connector is an additional component, which is required to be optically coupled to the end face of the optical fiber in an assembly, thus requiring additional component costs and additional manufacturing costs. Prior art expanded beam connectors still result in relatively high insertion losses and return losses.

The costs of producing optical fiber connectors must decrease if fiber optics is to be the communication media of choice for short haul and very short reach applications. The relatively widespread and ever increasing utilization of optical fibers in communication systems, data processing and other signal transmission systems has created a demand for satisfactory and efficient means of inter-connecting terminated optical fiber terminals.

It is therefore desirable to develop an improved optical fiber expanded beam connector, which has low insertion loss and low return loss, and which can be fabricated in high throughput and at low costs.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

SUMMARY OF THE INVENTION

Figure 1A:
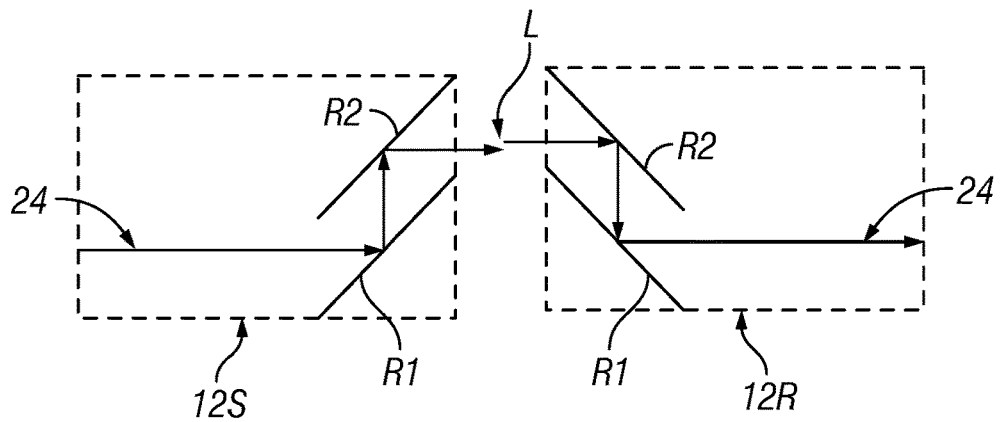
FIGS. 1A-1C are schematic views of the optical path between two aligned ferrules in accordance with one embodiment of the present invention.

The present invention provides an optical fiber ferrule or ferrule assembly for expanding light beam in an optical fiber expanded beam connector, which overcomes many of the drawbacks of the prior art ferrules and connectors, including low insertion and return losses, ease of use and high reliability with low environmental sensitivity, and which can be fabricated at low cost. Given the configuration of the inventive ferrules, the foot-print or form factor of the housing of the optical fiber connector incorporating the inventive ferrule for multi-fibers can be similar to that of housings that currently use prior art cylindrical ferrules designed for only a single fiber (i.e., the inventive ferrules may be incorporated in industry standard connector housings designed for single fiber, such as SC, FC, ST, SMA, LC, Dual LC, etc., type housings.)

In one aspect of the present invention, the inventive ferrule assembly comprises a first ferrule halve having an integrated first reflective surface and a complementary second ferrule halve having a second reflective surface, which together securely retain and accurately align the end of at least one optical fiber with respect to the external geometry of the ferrule halves/assembly. In one embodiment, a groove is provided on the ferrule halves to retain and align a bare section at the end of each optical fiber (with cladding exposed, without protective buffer and jacket layers). The end of the optical fiber is thus terminated by the ferrule assembly.

The integrated first reflective surface is located near the distal end of the first ferrule halve, beyond the end face of the optical fiber, which bends light with respect to the optical axis of the optical fiber held in the ferrule assembly. In one embodiment, the first reflective surface bends light from the optical fiber by 90 degrees in a diverging manner (or in reverse, focuses light to the core of the optical fiber). In one embodiment, the ferrule assembly is configured to retain and align a plurality of optical fibers, with a plurality of first reflective surfaces provided on the first ferrule halve, each corresponding to one optical fiber.

The integrated second reflective surface is located near the distal end of the second ferrule halve, at a location corresponding to the first reflective surfaces in the first ferrule halve, such that when the first and second ferrule halves are attached in a mating fashion to form the overall ferrule assembly, the first reflective surface overlap the second reflective surface in a plane perpendicular to the longitudinal axis of the ferrule assembly. The second reflective surface bends light with respect to the light path from the first reflective surface. In one embodiment, the second reflective surface bends light from the first reflective surface by 90 degrees, in a collimating manner (or in reverse, converging light to the first reflective surface). In one embodiment, the second ferrule halve is configured with a plurality of second reflective surfaces, each corresponding to one first reflective surface and optical fiber.

The first reflective surface in the first ferrule halve is structured with a reflective geometry that bends (i.e., turns or folds) and reshapes (i.e., diverges) output light from the end face of the optical fiber held in the first ferrule assembly (or in reverse, bends and reshapes (i.e., focuses) incident light from the second reflective surface). The second reflective surface in the second ferrule halve is structured with a reflective geometry that bends (i.e., turns or folds) and reshapes (i.e., collimates) incident light from the first reflective surface (or in reverse, converges incident light to reflect to the first reflective surface in the first ferrule halve). After assembly of the first and second ferrule halves, optical signal can be passed between the first and second reflective surfaces. In one embodiment, the first reflective surface is structured to be convex reflective (e.g., an aspherical convex mirror surface) the second reflective surface is structured to be concave reflective (e.g., an aspherical concave mirror surface). Alternatively, the first reflective surface may be structured to be concave reflective with light divergence characteristics. The structured first reflective surfaces are optically aligned with the optical axis of the optical fiber along the desired optical path, with the end face of the optical fiber located at a predetermined desired distance from the first reflective surface. The spot size of the collimated expanded beam is related to the distance along the optical path between the end face of the optical fiber and the first reflective surface (a diverging/focusing surface), the geometry of the first reflective surface (a diverging/focusing surface), and further the distance between the first and second reflective surfaces (a collimating/converging surface).

The first and second reflective surfaces may be passively aligned by passively aligning the first and second ferrule halves (e.g., relying on alignment surface features and/or indicia provided on the first and/or second ferrules halves. Alternatively, the first and second reflective surfaces may be actively aligned by passing an optical signal between the reflective surfaces.

The ferrule assembly has an external surface for alignment with a complementary surface of an external alignment sleeve (i.e., the inside surface of a generally cylindrical or tubular sleeve). The external surface of the ferrule assembly is generally cylindrical, having a contact surface profile with a cross-section that is generally oval. Two similarly terminated optical fibers can be optically coupled end-to-end by the alignment sleeve.

In use, two similar ferrule assemblies are inserted into the alignment sleeve, with the reflective surfaces of the extended ends of the respective ferrule assemblies facing each other. Output light from the optical fiber held in a first ferrule assembly is bent and diverged by the first reflective surface to be transmitted to the facing second reflective surface at the second ferrule halve, followed by the second reflective surface bending and collimating the light to be output from the first ferrule assembly and directed to the input of a second ferrule halve in a facing second ferrule assembly of similar optical configuration and path. The optical path in the first ferrule assembly resembles a "Z", which includes two 90-degree bends in one embodiment. The light into the second ferrule assembly is subject to the reverse of the optical reshaping that took place at the first ferrule assembly. Specifically, light into the second ferrule assembly is bent and converged by a second reflective surface on a second ferrule halve, followed by further bending and focusing by a first reflective surface on a first ferrule halve. The optical path in the second ferrule assembly also resembles a "Z", but in reverse compared to the first ferrule assembly, which also includes two 90-degree bends in one embodiment.

In one embodiment, the reflective surfaces are each an opaque free surface facing away from the body of the ferrule halve. The free surface is exposed to the exterior (e.g., air or an index matching material), and reflecting incident light directed at the free surface from the exterior side (i.e., the incident light is not directed through the body of the ferrule).

In another aspect of the present invention, the ferrule components and/or sleeve are precision formed by high throughput processes, such as stamping a metal blank material. In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). Each ferrule halve may be stamped to form a unitary or monolithic body, which does not require further attachment of sub-components within the ferrule halve.

In another aspect of the present invention, the ferrule assembly is incorporated in an optical fiber connector.

The ferrule in accordance with the present invention overcomes many of the deficiencies of the prior art, resulting in an optical fiber expanded beam connector with low insertion and return losses, which provides ease of use and high reliability with low environmental sensitivity, and which can be fabricated at low cost.

Accordingly, the present invention is directed to: An expanded beam ferrule includes a first ferrule halve having first reflective surfaces and a second ferrule halve having second reflective surfaces, which together retain optical fibers. The pair of reflective surfaces output collimated light parallel to the mid-plane of the ferrule. An external sleeve aligns the external surface of two similar ferrules, with corresponding second reflective surfaces of the ferrules facing each other. Output light from an optical fiber held in one ferrule is bent twice by the pair of reflective surfaces, with beam divergence after the first bent, and collimation after the second bent. The collimated light is transmitted to the facing second reflective surface in a facing second ferrule aligned by the sleeve, which is subject to optical reshaping in reverse to that undertaken in the first ferrule, so as to converge and focus light to input to the optical fiber held in the other ferrule.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

Figure 1B:
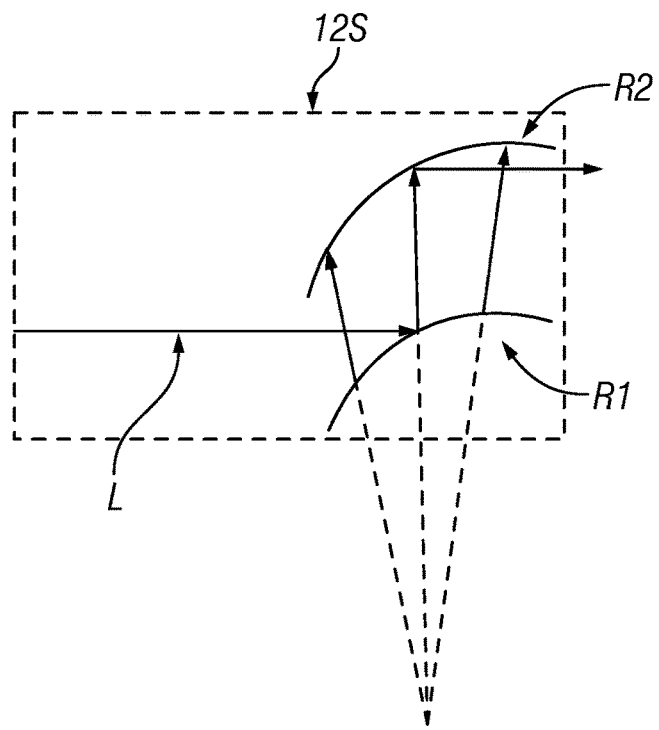
Figure 1C:
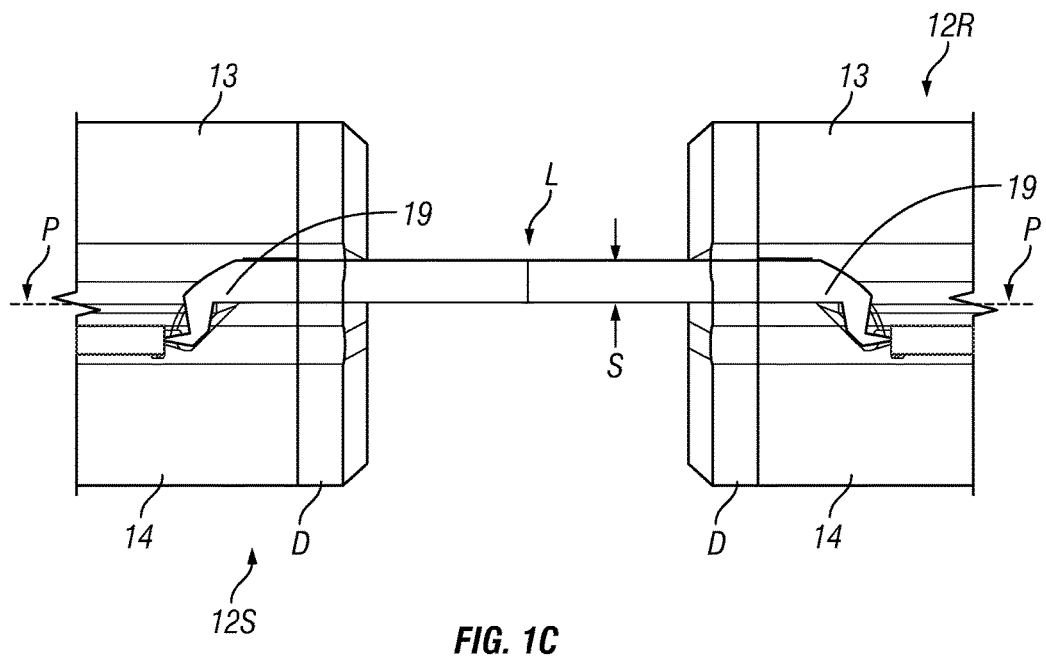

FIGS. 1A-1C are schematic views illustrating the optical path between two aligned ferrule assemblies incorporated in optical fiber connectors in accordance with one embodiment of the present invention. For simplicity, hereinafter, "ferrule assembly" will be referred simply as a "ferrule", which has two ferrule halves. Further details on the ferrule will be disclosed hereinbelow.

FIG. 1A schematically illustrates the light beam L from a source ferrule 12S to a receiving ferrule 12R. The source ferrule 12S and the receiving ferrule 12R each includes a pair of integrated reflective surfaces R1 (e.g., a diverging/focusing mirror) and R2 (e.g., a collimating/converging mirror), with similar optical geometries between the two ferrules. In one embodiment, the ferrules 12R and 12S may have similar or identical overall physical structure. The pair of reflective surfaces R1 and R2 in each ferrule overlap (in a cross-sectional plane perpendicular to the longitudinal axis of the ferrule) and face each other. Light beam L emitted from the output end (core) of an optical fiber 24 held in the source ferrule 12S is turned and diverged by its reflective surface R1, to be incident at the reflective surface R2. The light beam L is turned and collimated by the reflective surface R2, to be incident at the corresponding reflective surface R2 at the receiving ferrule 12S, which then turns and converges the collimated light beam to R1 in the receiving ferrule 12R. Reflective surface R1 then turns and focuses the light beam at the input end (core) of an optical fiber 24 held in the receiving ferrule 12R. In one embodiment, the reflective surfaces R1 and R2 in each ferrule are configured to reflect light from/to the optical fiber 24 to/from outside the ferrule, in a direction parallel to the optical fiber axis/longitudinal axis/mid-plane P of the ferrule (which corresponds to the mating plane P of the ferrule halves 13 and 14 in the embodiment discussed below). The optical path L in each ferrule resembles a "Z", which includes two 90-degree bends in the illustrated embodiment.

FIG. 1B schematically illustrates the relative geometries of the pair of reflective surfaces R1 and R2. As schematically shown, reflective surface R1 is a convex reflective surface (e.g. a convex aspherical reflective surface), and reflective surface R2 is a concave reflective surface (e.g., a concave aspherical reflective surface).

As shown in FIG. 1C, the optical path L resembles a "Z" in each ferrule 12R and 12S, which includes two 90-degree bends in each ferrule. The optical axes (or centerlines) of the optical fibers 24 are spaced substantially parallel to the mid-plane P of the respective ferrules, which corresponds to the mating plane P of the ferrule halves 13 and 14. The light output from the source ferrule 12S and the light input into the receiving ferrule 12R are substantially parallel to the optical axis (or centerline) of the optical fibers 24 held in the respective ferrules. The centerlines of the respective optical fibers 24 are offset on either side of and parallel to the mid-plane P in each ferrule (12R, 12S).

Within the source ferrule 12S, given the divergence of the emitted light beam L from the source optical fiber 24 held in the ferrule 12S, the light beam L expands before reaching the reflective surface R1, which further diverges/expands the beam before reaching the collimating reflective surface R2. Hence, the resultant collimated light would have a diameter/spot size S significantly larger than the spot size of the light beam emerging from the end face of the optical fiber 24 (see FIG. 1C). Accordingly, the section of the light beam L between the ferrules 12S and 12R would be an expanded beam, as shown in FIG. 1C. As illustrated, the corresponding reflective surfaces R2 of the respective ferrules 12R and 12S are exposed to each other between the ferrules 12 S and 12R. The reflective surfaces R2 are optically exposed through an opening at the end of the respective ferrules 12R and 12S. However, the reflective surfaces R1 are not optically exposed through any opening at the end of the respective ferrules 12R and 12S.

Given the fiber centerline and the ferrule opening for emitted/incident are at a distance (e.g., of about 0.15 mm) on either side of and parallel to the mid-plane P of the ferrule, a space (e.g., of about 0.3 mm) is present between the reflective surfaces R2 and R1 (the latter corresponding to fiber centerline). This space and the ferrule opening creates a cavity 19, which may retain dust and debris entering from the open end of the ferrule. A transparent window is used as a dust cap D, which is placed over the open end of the respective ferrules to seal the cavity 19. (The structure of the dust cap D will be further described below in connection with FIG. 3C.) As further shown in FIG. 1C, there is no physical contact between the end faces of the optical fibers 24 in the facing ferrules. While FIG. 1C shows a space between the dust caps D of the ferrules, in use, the ends of the ferrules are pressed against each other at the dust caps D. There is however no need to maintain alignment of the ferrules 12R and 12S in the axial direction of the ferrules (even though lateral alignment about the axial direction is still required by using an alignment sleeve (shown in FIG. 2C), as the axial extended beam relaxes the requirements for the distance between fiber end faces. No mechanical polishing of the ferrule end faces would be required, thus simplifying fabrication process and reducing fabrication costs. Further, the relative larger spot size of the expanded beam reduces the influence of contamination by dust and debris. Given physical contact between the end faces of the optical fibers 24 is not necessary, the durability of the mechanical interface between optical fiber connectors would increase. Lighter axial preload forces can be used since physical contact of opposing fiber end faces is not necessary. Furthermore, more misalignment between optical fiber connectors can be tolerated, since larger beam diameter permits more misalignment between connectors.

The cavity 19 could be left empty (i.e., filled with air), or it could be filled with a different material have a different refractive index (e.g., a polymer or epoxy that is index matched to the core of the optical fiber) to minimize reflections at the interfaces of the fiber ends. Filling the cavity 19 with another material has the additional benefits of preventing particles/dust from getting trapped in the cavity and preventing damages to the reflective surfaces R1 and R2.

Figure 2A:
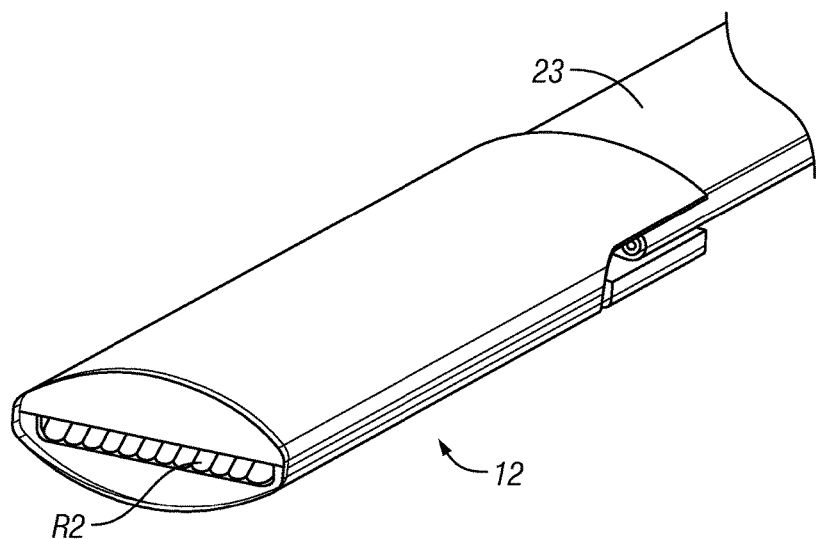
FIGS. 2A-2D illustrate coupling of two ferrules with an alignment sleeve, in accordance with one embodiment of the present invention.

FIGS. 2A-2D illustrate coupling two ferrules (with similar structure shown in FIG. 2A) with an alignment sleeve, in accordance with one embodiment of the present invention. The ferrules 12R and 12S each has an external surface for alignment with a complementary surface of an external alignment sleeve 20 (i.e., the internal surface of a generally cylindrical or tubular sleeve 20). The external surface of each ferrule is generally cylindrical, having a contact surface profile with a cross-section that is generally oval. Two similarly terminated optical fibers can be optically coupled end-to-end by the alignment sleeve 20, with two similar ferrules 12 (as shown in FIG. 2A) inserted into the alignment sleeve 20, with the reflective surfaces R2 of the respective ferrules facing each other, to conform to the optical path shown in FIG. 1C.

Figure 2B:
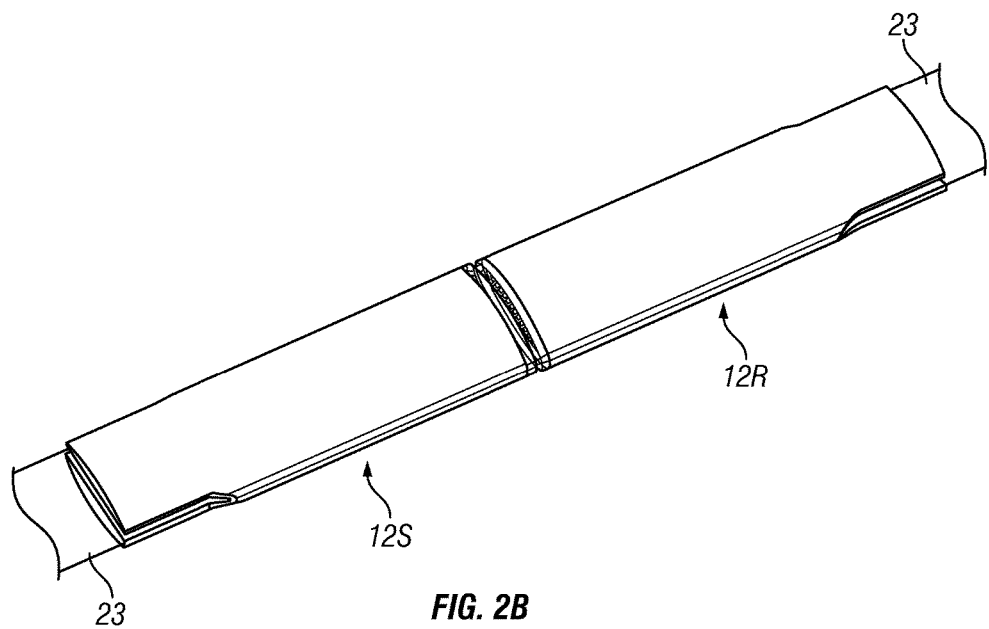
Figure 2C:
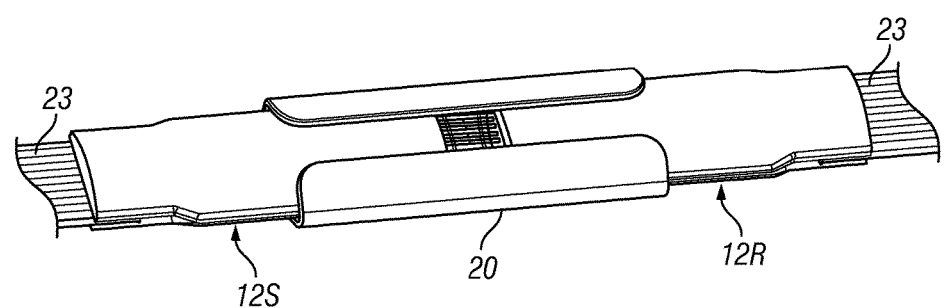
Figure 2D:
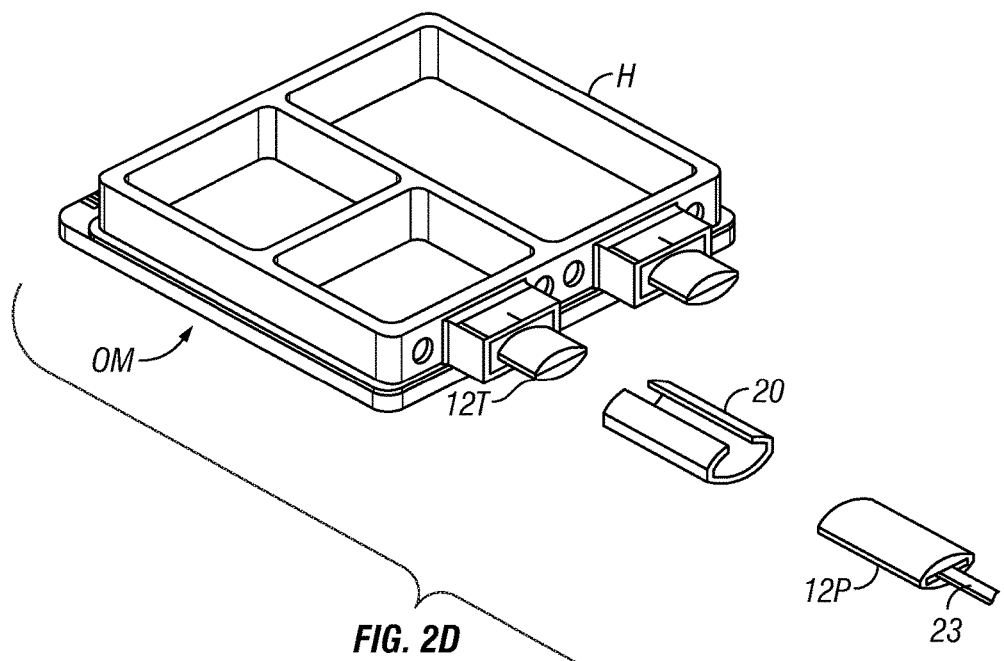

Referring to FIG. 2B, separate ferrules 12R and 12S are provided, which have at least similar external curved surface profiles for alignment sleeve 20, and similar reflective surfaces R1 and R2 having similar optical geometries between the two ferrules. As shown in FIG. 2B, each ferrule (12R, 12S) terminates a plurality of optical fibers of a fiber cable ribbon 23. The ferrules 12R and 12S are coupled with the respective reflective surfaces R1 and R2, conforming to the configuration shown in FIG. 1C. The sleeve 20 is not shown in FIG. 2B, but is shown in FIG. 2C. The ferrules 12R and 12S are axially aligned by the sleeve 20. The expanded light beam reflected between the ferrules are parallel to the longitudinal axis and to the mid-plane (mating plane) P of the ferrules. The mid-plane P of the ferrule 12 is also the mating plane of the ferrule halves 13 and 14 of the respective ferrules 12R and 12S. In this embodiment, the alignment sleeve 20 is a split sleeve, conforming to the exterior surface profile of the ferrules 12R and 12S. The alignment sleeve 20 aligns the optical fibers 24 by aligning the exterior surfaces of the ferrules 12R and 12S to achieve the aligned position shown in FIG. 1C with the optical path L (as noted above, the spacing between the ferrule ends would not be present as the ferrules are inserted into the sleeve to butt against each other).

In another embodiment, an expanded beam ferrule disclosed above may be a demountable terminal ferrule 12T (i.e., a "pigtail") attached to an optical device (e.g., a housing H of a hermetically sealed optoelectronic module OM). An optical fiber ribbon 23 terminated with a similar expanded beam ferrule 12P (e.g., a patch cord) can be connected to the terminal ferrule 12T using an alignment sleeve 20 (e.g., a split sleeve having complementary shape sized to receive the ferrules 12T and 12P).

Various embodiments of the present invention incorporate some of the inventive concepts developed by the Assignee of the present invention, nanoPrecision Products, Inc., including various proprietary including optical bench subassemblies for use in connection with optical data transmissions, including the concepts disclosed in the patent publications discussed below, which have been commonly assigned to the Assignee.

For example, PCT Patent Application Publication No. WO2014/011283A2 discloses a ferrule for an optical fiber connector, which overcomes many of the drawbacks of the prior art ferrules and connectors, and further improves on the above noted pin-less alignment ferrules. The optical fiber connector includes an optical fiber ferrule, which has a generally oval cross-section for aligning an array of multiple optical fibers to optical fibers held in another ferrule using a sleeve.

U.S. Patent Application Publication No. US2013/0322818A1 discloses an optical coupling device for routing optical signals, which is in the form of an optical bench having a stamped structured surface for routing optical data signals. The optical bench comprising a metal base having a structured surface defined therein, wherein the structured surface has a surface profile that bends, reflects, and/or reshapes an incident light. The base further defines an alignment structure, which is configured with a surface feature to facilitate precisely positioning an optical component (e.g., an optical fiber) on the base in precise optical alignment with the structured surface to allow light to be transmitted along a defined path between the structured surface and the optical component, wherein the structured surface and the alignment structure are integrally defined on the base by stamping a malleable metal material to form an optical bench.

U.S. Patent Application Publication No. US2015/0355420A1 further discloses an optical coupling device for routing optical signals for use in an optical communications module, in particular an optical coupling device in the form of an optical bench, in which integrally defined on a metal base is a structured reflective surface having a surface profile that bends, reflects and/or reshapes an incident light. An alignment structure is defined on the base, configured with a surface feature to facilitate positioning an optical component (e.g., an optical fiber) on the base in optical alignment with the structured surface to allow light to be transmitted along a defined path between the structured surface and the optical component. The structured surface and the alignment structure are integrally defined on the base by stamping a malleable metal material of the base. The alignment structure facilitates passive alignment of the optical component on the base in optical alignment with the structured surface to allow light to be transmitted along a defined path between the structured surface and the optical component.

U.S. Patent Application Publication No. US2013/0294732A1 further discloses a hermetic optical fiber alignment assembly having an integrated optical element, in particular a hermetic optical fiber alignment assembly including an optical bench that comprises a metal ferrule portion having a plurality of grooves receiving the end sections of optical fibers, wherein the grooves define the location and orientation of the end sections with respect to the ferrule portion. The assembly includes an integrated optical element for coupling the input/output of an optical fiber to optoelectronic devices in an optoelectronic module. The optical element can be in the form of a structured reflective surface. The end of the optical fiber is at a defined distance to and aligned with the structured reflective surface. The structured reflective surfaces and the fiber alignment grooves can be formed by stamping a malleable metal to define those features on a metal base.

U.S. Pat. No. 7,343,770 discloses a novel precision stamping system for manufacturing small tolerance parts. Such inventive stamping system can be implemented in various stamping processes to produce the devices disclosed in the above-noted patent publications. These stamping processes involve stamping a stock material (e.g., a metal blank), to form the final overall geometry and geometry of the surface features at tight (i.e., small) tolerances, including reflective surfaces having a desired geometry in precise alignment with the other defined surface features.

U.S. Patent Application Publication No. US2016/0016218A1 further discloses a composite structure including a base having a main portion and an auxiliary portion of dissimilar metallic materials. The base and the auxiliary portion are shaped by stamping. As the auxiliary portion is stamped, it interlocks with the base, and at the same time forming the desired structured features on the auxiliary portion, such as a structured reflective surface, optical fiber alignment features, etc. With this approach, relatively less critical structured features can be shaped on the bulk of the base with less effort to maintain a relatively larger tolerance, while the relatively more critical structured features on the auxiliary portion are more precisely shaped with further considerations to define dimensions, geometries and/or finishes at relatively smaller tolerances. The auxiliary portion may include a further composite structure of two dissimilar metallic materials associated with different properties for stamping different structured features. This stamping approach improves on the earlier stamping process in U.S. Pat. No. 7,343,770, in which the stock material that is subjected to stamping is a homogenous material (e.g., a strip of metal, such as Kovar, aluminum, etc.) The stamping process produces structural features out of the single homogeneous material. Thus, different features would share the properties of the material, which may not be optimized for one or more features. For example, a material that has a property suitable for stamping an alignment feature may not possess a property that is suitable for stamping a reflective surface feature having the best light reflective efficiency to reduce optical signal losses.

The above inventive concepts are incorporated by reference herein, and will be referred below to facilitate disclosure of the present invention.

Figure 3A:
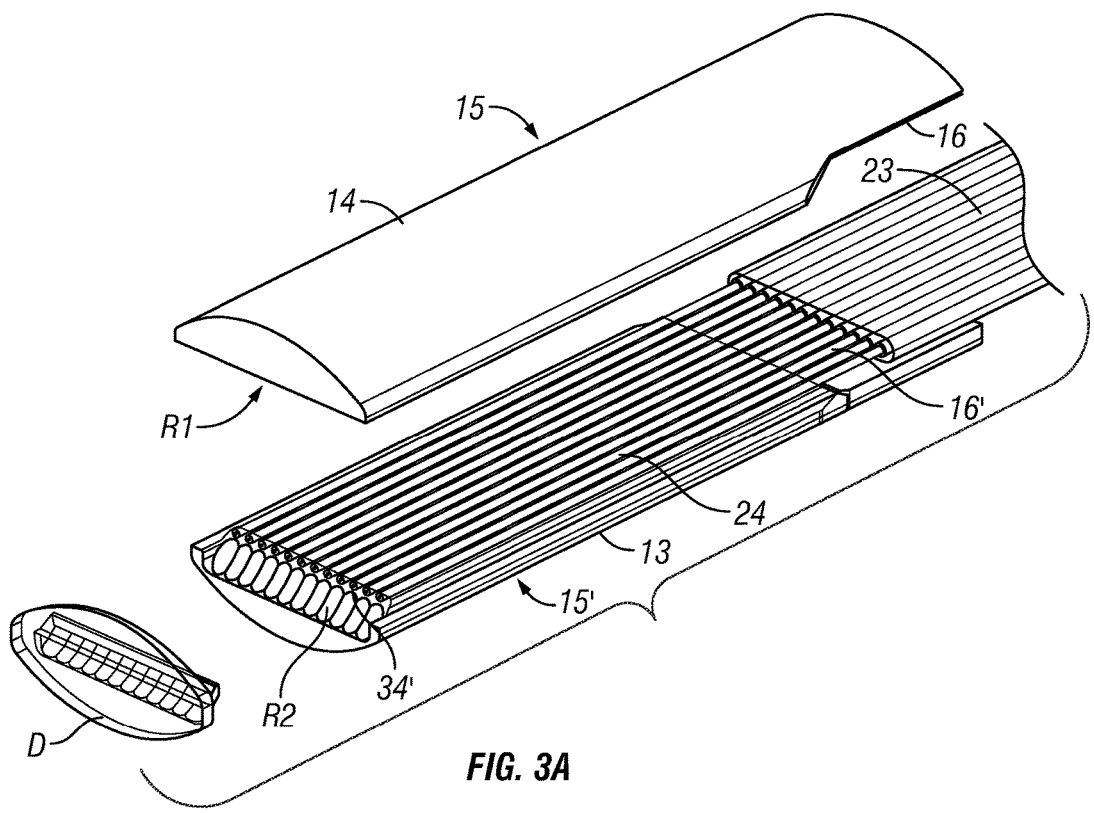
FIGS. 3A-3C illustrate various views of an optical fiber ferrule assembly in accordance with one embodiment of the present invention.
Figure 3B:
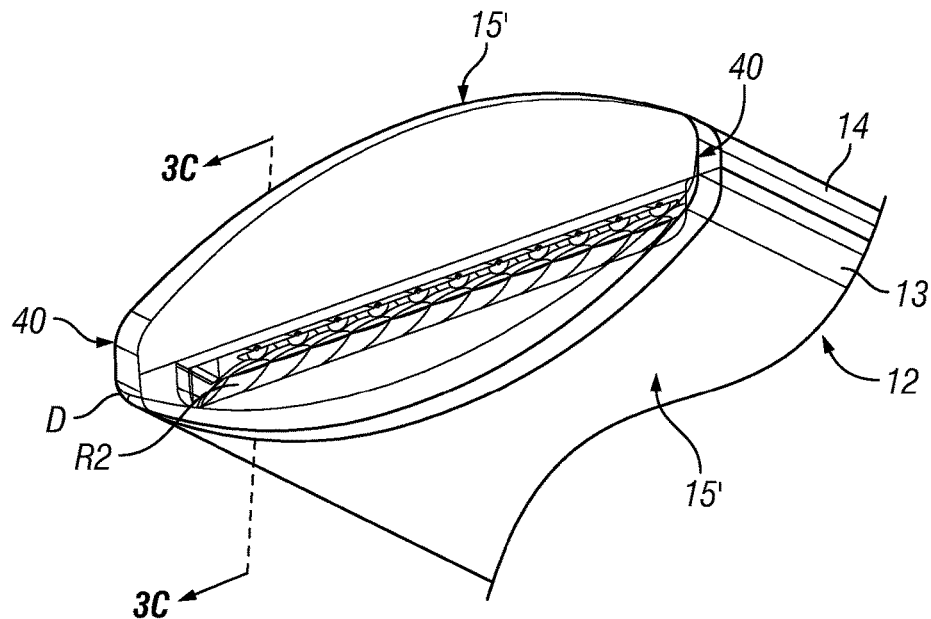
Figure 3C:
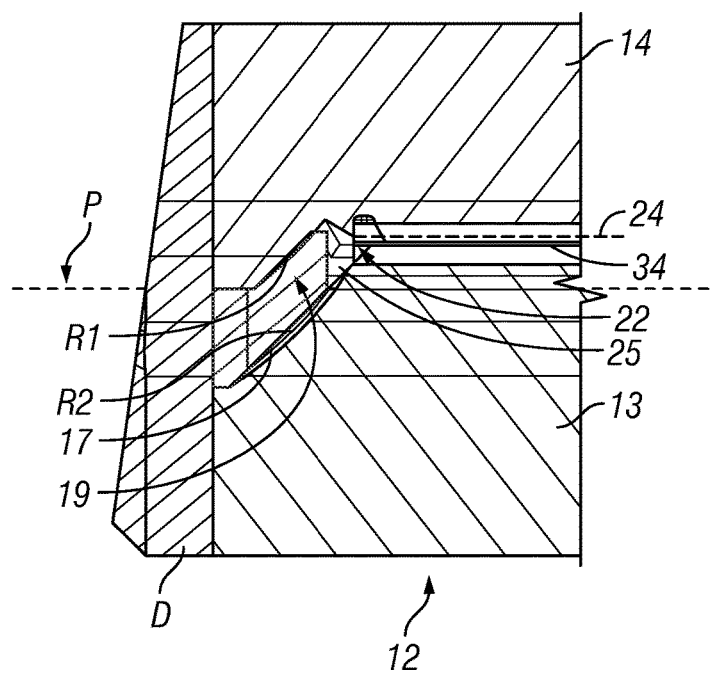

FIGS. 3A-3C illustrate various views of a ferrule 12 for use within an optical fiber connector 10 (see FIG. 10C), in accordance with one embodiment of the present invention. The ferrule 12 comprising two ferrule halves 13 and 14 supporting an array of optical fibers 24 of an optical fiber ribbon 23. The structures of the ferrule halves 13 and 14 will be explained in greater detail below in connection with FIGS. 4 and 5. The ferrule 12 has an overall generally cylindrical body, having a generally oval shaped cross-section (see FIG. 3B, which is a perspective end view of the ferrule 12 from the its free distal end (with the dust cap D). It is noted that the lateral sides 40 of the ferrule 12 are truncated with a generally flat surface or a surface with a substantially larger radius of curvature.

Reference is made to PCT Patent Application Publication No. WO2014/011283A2 (which has been incorporated by reference herein), which discloses an optical fiber connector that includes an optical fiber ferrule, which has a generally oval cross-section for aligning an array of multiple optical fibers to optical fibers held in another ferrule using a sleeve. However, such disclosure does not utilize an expanded beam for optical coupling of the optical fibers held in ferrules. In the present invention, the inventive ferrule 12 includes integrated reflective surface R1 and R2 to implement an expanded beam.

The ferrule 12 is configured to retain and align a plurality of optical fibers 24 (within grooves (34, 34') in the ferrule halves 13 and 14, as will be explained further below), with an array of a plurality of pairs of integrated reflective surfaces R1 and R2 provided on the ferrule halves 13 and 14, each corresponding to one optical fiber 24. The distal end of the ferrule halve 14 is flush with the distal end of the complementary ferrule halve 13 (i.e., at the end opposite to the other end from which the fiber cable ribbon 23 extends). The array of pairs of reflective surfaces R1 and R2 is located near the distal end of the ferrule halves 13 and 14, beyond the end face 22 of the optical fiber 24. The end face 22 of each optical fiber 24 is located at a defined distance to (with the edge of the end face 22 butting against a stop 25 provided at the defined distance from the reflective surface R; see also FIG. 4B discussed below) and aligned with its corresponding reflective surfaces R1 and R2. Each pair of reflective surfaces R1 and R2 directs light to/from the input/output end 22 of each optical fiber 24 by reflection, to turn light with respect to the optical axis of the optical fiber 24 held in the ferrule 12. As explained in the earlier embodiment, each pair of reflective surfaces R1 and R2 turns light by 90 degrees twice (see FIG. 1C), so that the expanded beam exiting/entering the ferrule 12 is parallel to the fiber axis (or ferrule mid-plane P, or ferrule halve mating plane P).

FIG. 3C is a sectional view taken along line 3C-3C in FIG. 3B. In this illustrated embodiment, the window/dust cap D is shown with an angled surface, to reduce light reflection and back scattering at this window. Further, or in the alternate, an anti-reflect (AR) coating may be applied to the window. In the sectional view shown in FIG. 3C, the dust cap D may be provided with a hook 17, which is sized and shaped to fill the space in the cavity 19, thus further protecting the reflective surfaces R1 and R2 from contamination, and providing a better medium for the light beam through the space in the cavity 19.

Figure 4A:
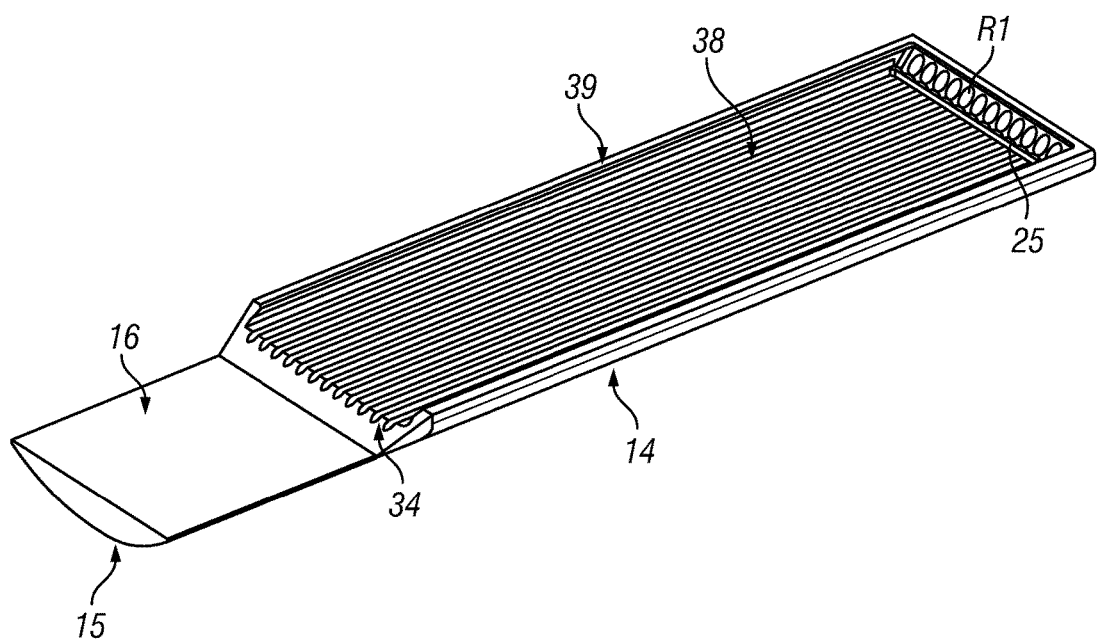
FIGS. 4A-4B illustrate various views of a ferrule halve having a convex reflective surface in the optical fiber ferrule assembly in FIG. 3, in accordance with one embodiment of the present invention.
Figure 4B:
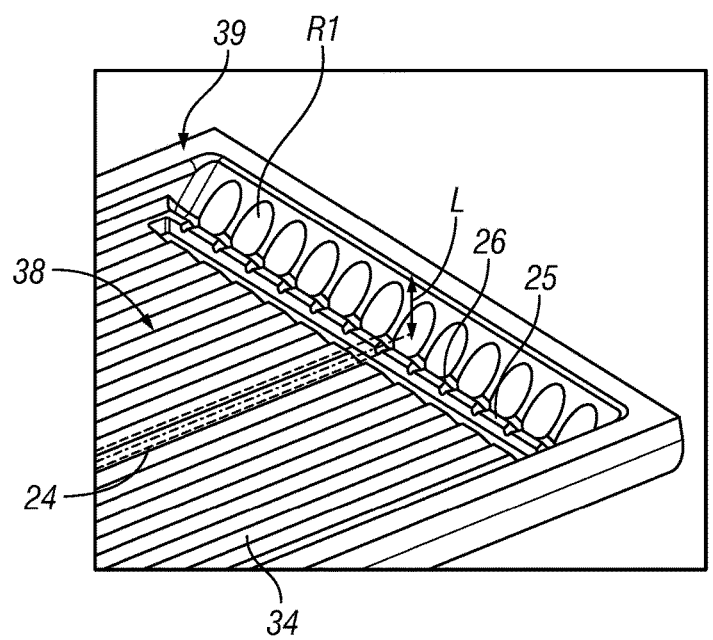

FIGS. 4A-4B illustrate various views of a ferrule halve 14 having a reflective surface R1 in the optical fiber ferrule assembly in FIG. 3, in accordance with one embodiment of the present invention. The ferrule halve 14 is provided with a curved exterior surface 15 (generally conforming to one half of an overall oval cross-section; see also FIGS. 3A and 3B), and an interior fiber alignment structure, comprising a plurality of parallel, longitudinal, open grooves 34 is provided on the inside surface 39 of the body of the ferrule halve 14 (the surface facing the other ferrule halve 13). The grooves 34 facilitate passive optical alignment of the optical fibers 24 with respect to the respective reflective surfaces R1 to allow light to be transmitted along a defined path between the reflective surfaces R1 and the optical fibers 24. In the illustrated embodiment, the grooves 34 are shown as semicircular in cross-section. However, grooves having V-shaped cross-section may also be used instead. Each integrated reflective surface R1 is an integral extension from an alignment groove 34 in the ferrule halve 14.

In the illustrated embodiment, each reflective surface R1 is an opaque free surface facing away from the opaque body of the ferrule halve 14. The free surface is exposed to the exterior (e.g., air or an index matching material), and reflecting incident light directed at the free surface from the exterior side (i.e., the incident light is not directed through the opaque body of the ferrule halve 14). Each reflective surface R1 is structured with a reflective geometry that bends (i.e., turns or folds) and reshapes (i.e., diverges) output light from the end face 22 of the optical fiber 24 held in the grooves 34 of ferrule halve 14 (or in reverse, bends and reshapes (i.e., focuses) external light incident at the reflective surface R1, at the end face 22 of the optical fiber 24). In one embodiment, the reflective surface R1 is structured to be convex reflective (e.g., an aspherical convex mirror surface). These reflective surfaces R1 appear as "bumps" on the surface. The structured reflective surface R1 is optically aligned with the optical axis of the optical fiber 24 along the desired optical path L, with the end face 22 of the optical fiber 24 located at a predetermined distance from the reflective surface R1 for the desired level of beam expansion before reaching the reflective surface R1. The diameter/spot size of the collimated expanded beam is related to the distance along the optical path L between the end face 22 of the optical fiber 24 and the reflective surface R1, the geometry of the diverging reflective surface R1, and the distance between the reflective surfaces R1 and R2.

Referring to the close-up view of FIG. 4B (and FIG. 3C), a stop 25 is provided to define the location of the end face 22 of each optical fiber 24 at a predetermined distance from the corresponding reflective surface R1. The stop 25 is structured with short, narrower grooves 26 (e.g., of semicircular cross-section) having a width smaller than the width of the fiber grooves 34. The stop 25 provides a defined limit which the end faces of the 22 of the optical fibers 24 can butt against, but allows light to pass between the optical fibers 34 and the respective reflective surfaces R1 through the grooves 26 in the stop 25. In FIG. 4B, a single optical fiber 24 is depicted by in phantom by dotted lines. As shown in FIG. 4B, a cavity 38 is provided in the surface 39 of the ferrule halve 14. The grooves 34 are provided within the cavity 38, and are recessed below the mating plane P (which is the contact or mating plane P with opposing ferrule halve 13, and is also the mid-plane P of the overall ferrule 12 shown in FIG. 3), and the cylindrical body of the optical fiber 24 does not protrude above the mating plane P. Accordingly, the centerline (optical axis) of the optical fiber 24 is offset from (i.e., below) and parallel to the plane P (as was the case in FIG. 1C). The mating plane P of the ferrule halve 14 is also the plane through which light emerges/enters the ferrule halve 14.

As shown in FIG. 4A, a platform 16 is provided at the fiber cable end of the ferrule halve 14. Referring also to FIG. 3A, the space defined at the region of the platform 16, which, in combination with a similar space defined by platform 16' at the complementary ferrule halve 13 discussed further below, would provide an overall space to accommodate the thickness of the fiber ribbon 24.

The ferrule halve 14 having the open structure of the reflective surfaces R1 and the fiber alignment grooves 34 lends itself to mass fabrication processes such as precision stamping. The present invention adopts the concept of stamping optical elements disclosed in U.S. Patent Application Publication No. US2013/0322818A, and U.S. Patent Application Publication No. US2015/0355420A1, which have been fully incorporated by reference herein. These patent publications disclose integrally defining by stamping a malleable metal material to integrally and simultaneously form reflective surfaces and fiber alignment grooves by stamping a malleable metal material (i.e., a stock metal material or metal blank).

In one embodiment, the various structures and features of the ferrule halve 14 are formed by stamping. Specifically, the ferrule halve 14 is formed by stamping a malleable metal material to integrally and simultaneously define the exterior curved surface 15, the platform 16, and the features on the interior surface 39 (including the grooves 34, the stops 25, and the reflective surfaces R1). Effectively, a one-piece open ferrule halve 14 can be produced to support the optical fibers 24 with their ends in precise location and alignment with respect to the reflective surfaces R1, and further in alignment to the external geometry of the ferrule halve 14 as well as to the reflective surface R2 of the other ferrule halve 13 (which will be explained below, which can also be formed by similar stamping processes). In the present invention, the contact between the alignment sleeve 20 and the ferrule 12 (including the ferrules halves 13 and 14) contribute to and define the alignment of the optical fibers and the reflective surfaces R1 and R2 in the ferrule 12 with respect to another similar ferrule 12, as was in the case of ferrules 12R and 12S aligned by a sleeve 20 in FIG. 2.

Figure 5A:
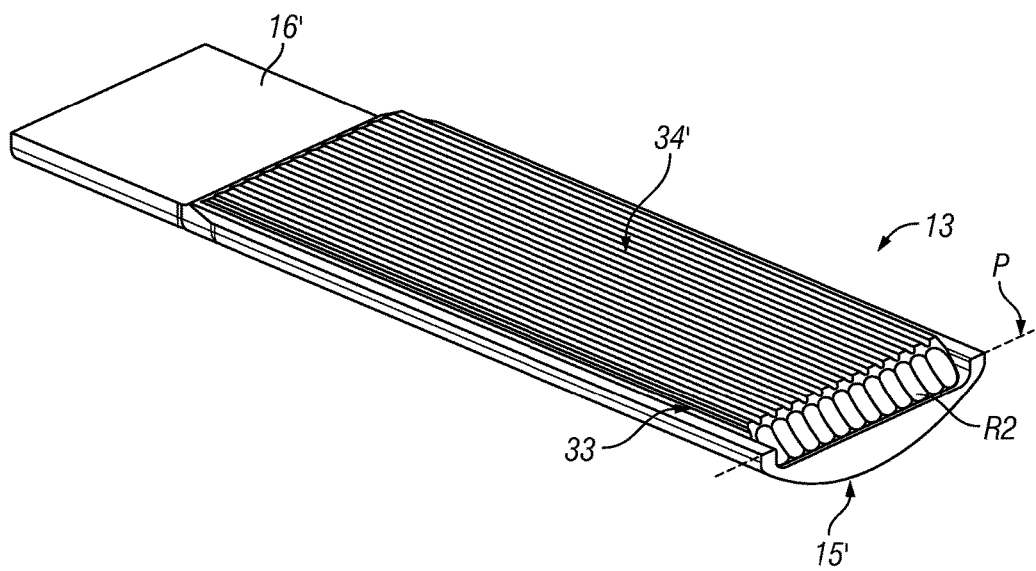
FIGS. 5A-5B illustrate various views of a complementary ferrule halve having a concave reflective surface in the optical fiber ferrule assembly in FIG. 3, in accordance with one embodiment of the present invention.
Figure 5B:
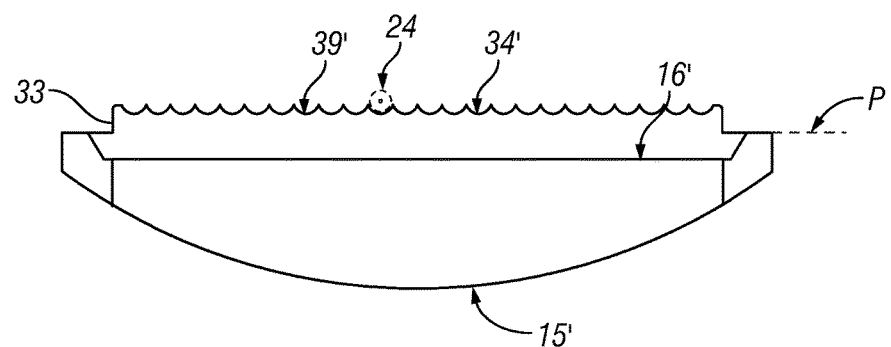

FIGS. 5A and 5B illustrate a complementary ferrule halve 13 in the optical fiber ferrule assembly in FIG. 3, in accordance with one embodiment of the present invention. The ferrule halve 13 shares some of the structural features of the ferrule halve 14 (e.g., fiber grooves 34'). Notably, the ferrule halve 13 includes reflective surfaces R2 of a different geometry (concave reflective) compared to reflective surfaces R1 (convex reflective). Given the optical fibers do not direct light directly at the reflective surfaces R2, there is no fiber stop is necessary to be provided with respect to the reflective surfaces R2.

In the illustrated embodiment, each reflective surface R2 is an opaque free surface facing away from the opaque body of the ferrule halve 13. The free surface is exposed to the exterior (e.g., air or an index matching material), and reflecting incident light directed at the free surface from the exterior side (i.e., the incident light is not directed through the opaque body of the ferrule halve 13). Each reflective surface R2 is structured with a reflective geometry that bends (i.e., turns or folds) and reshapes (i.e., collimates) incident light from the reflective surface R1 (or in reverse, bends and reshapes (i.e., converge) external light incident at the reflective surface R2, at the reflective surface R1). In one embodiment, the reflective surface R2 is structured to be concave reflective (e.g., an aspherical concave mirror surface). The structured reflective surface R2 is optically aligned with the optical axis of the reflective surface R1 along the desired optical path L, at a predetermined distance from the reflective surface R1 for the desired level of beam expansion before reaching the reflective surface R2. The diameter/spot size of the collimated expanded beam is related to the distance along the optical path L between the end face 22 of the optical fiber 24 and the reflective surface R1, the geometry of the diverging reflective surface R1, and the distance between the reflective surfaces R1 and R2.

Referring also to FIGS. 3A and 3B, as with the ferrule halve 14, the ferrule halve 13 is provided with a similar curved exterior surface 15' (generally conforming to one half of an overall oval cross-section), and an interior fiber alignment structure, comprising a plurality of parallel, longitudinal, open grooves 34' is provided on the inside surface 39' of the body of the ferrule halve 13 (the surface facing the other ferrule halve 14). The fiber grooves 34' (similar to the grooves 34 in the ferrule halve 34) are complementary to the grooves 34 in ferrule halve 14, which together the grooves 34 and 34' align optical fiber 24.

Referring to FIG. 5B, the interior surface 39' at which the grooves 34' are defined are raised above the mating plane P (raised portion 33). This is necessary since the grooves 34 in the opposing ferrule halve 14 are below the mating plane P, as discussed above. The grooves 34'is raised above the mating plane P, which is the contact plane P with opposing ferrule halve 13, and corresponds to the mid-plane P of the overall ferrule 12 shown in FIG. 3. The mating plane P of the ferrule halve 13 is also the plane through which light emerges/enters the ferrule halve 13.

The width of the raised portion 33 of the ferrule halve 13 is similar to (or within acceptable tolerance, slightly less than) the width of the cavity 38 of the ferrule halve 14, so that the raised portion 33 can fit in the cavity 38 with little or no play. In effect, the raised portion 33 and the cavity 38 provides a mean of aligning the ferrules halves 13 and 14 (at least in the cross-sectional plane perpendicular to the axis of the ferrule 12), so that the grooves 34 and 34' match up, and the exterior curved surfaces 15 and 15' of the ferrule halves forming the desired generally oval sectional profile.

As was in the ferrule halve 14, a platform 16' is provided at the fiber cable end of the ferrule halve 13, and a space is defined at the region of the platform 16', which, in combination with a similar space defined at the complementary ferrule halve 14 discussed above, would provide an overall space to accommodate the thickness of the fiber ribbon 23, as shown in the assembled ferrule 12 in FIG. 3A.

With the ferrule halves 13 and 14 assembled together with the optical fiber ribbon 23, with the ferrule halves 13 and 14 are mated along the mating plane P, the optical fibers 24 are sandwiched between the respective pairs of complementary grooves 34 and 34', thereby forming the ferrule 12 shown in FIG. 3.

As was in the case of the ferrule halve 14, the various structures and features of the ferrule halve 13 can be formed by stamping. Specifically, the ferrule halve 13 is formed by stamping a malleable metal material to integrally and simultaneously define the exterior curved surface 15', the platform 16', the cover portion 35, and the features on the interior surface 39' (including the grooves 34'). Effectively, a one-piece open ferrule halve 13 can be produced to complement the ferrule halve 14 to support the optical fibers 24 with their ends in precise location and alignment with respect to the reflective surfaces R1 and R2, and further in alignment to the external geometry of the ferrule halve 13 as well as to the features of the ferrule halve 14. As noted above in reference to the ferrule halve 14, the present invention relies on the contact between the alignment sleeve 20 and the ferrule 12 (including the ferrules halves 13 and 14), to define the alignment of the optical fibers and the reflective surfaces R in the ferrule 12 with respect to another similar ferrule 12, as was in the case of ferrules 12R and 12S aligned by a sleeve 20 in FIG. 2.

For the ferrules described above, given optical alignment of adjoining ferrules at the optical fiber connectors relies on alignment sleeves, the external surfaces of the ferrule should be maintained at high tolerance as well for alignment using an alignment sleeve. In the embodiments described above, no alignment pin is required for alignment of a pair of ferrules. Accordingly, for stamping the ferrule halves, that would include stamping all the critical features of the entire body of the ferrule halves, including forming the grooves, reflective surfaces, mating surfaces of the ferrule portions, and external surfaces that come into contact with the alignment sleeve and the ends of another ferrule. In one embodiment, the alignment sleeve may be precision formed by stamping as well. This maintains the dimensional relationship between the grooves and external alignment surfaces of the ferrules, to optical facilitate alignment using alignment sleeves only without relying on alignment pins.

In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass). Each ferrule halve may be stamped to form a unitary or monolithic body, which does not require further attachment of sub-components within each ferrule halve.

Figure 6A:
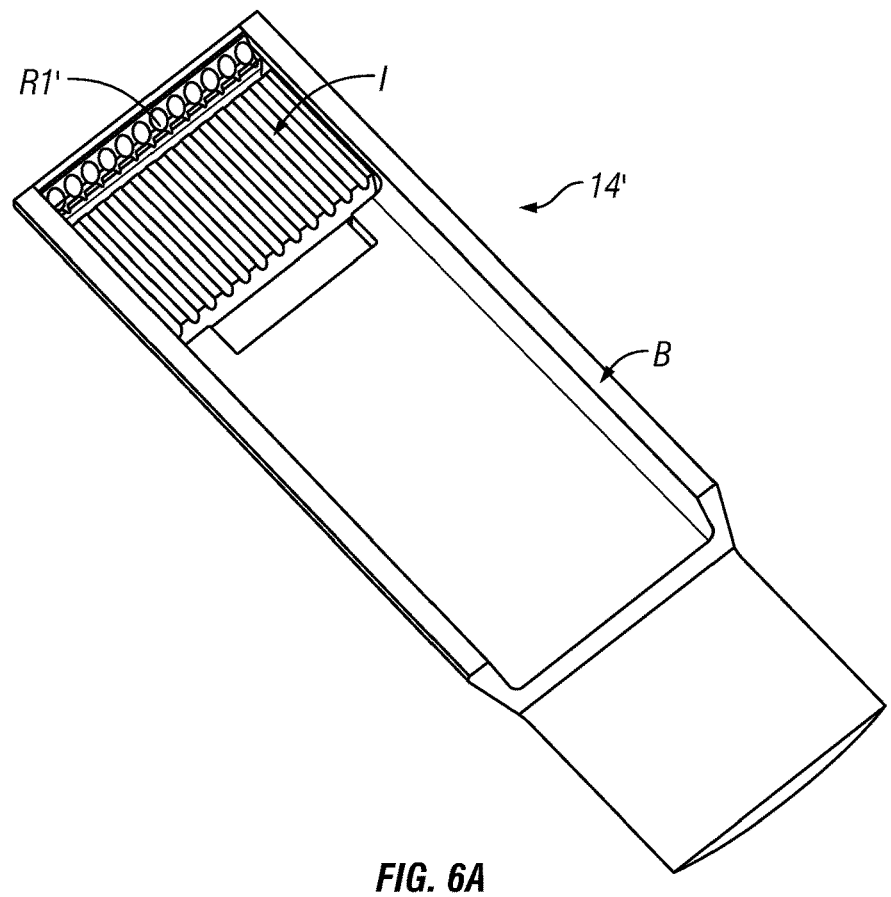
FIGS. 6A-6F illustrate various views of an optical fiber ferrule assembly having inserts with reflective surfaces, in accordance with another embodiment of the present invention.
Figure 6B:
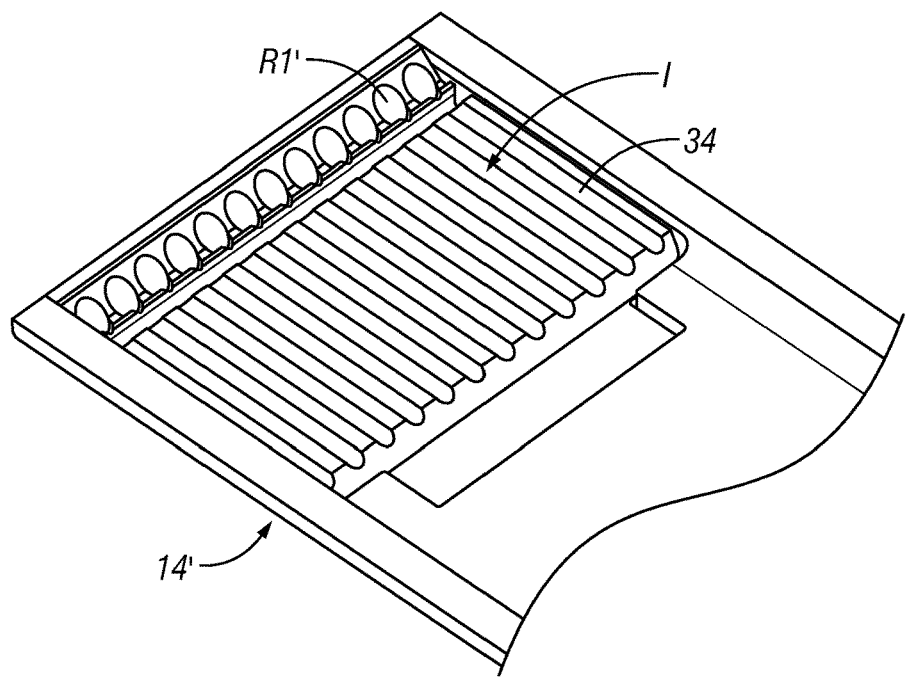
Figure 6C:
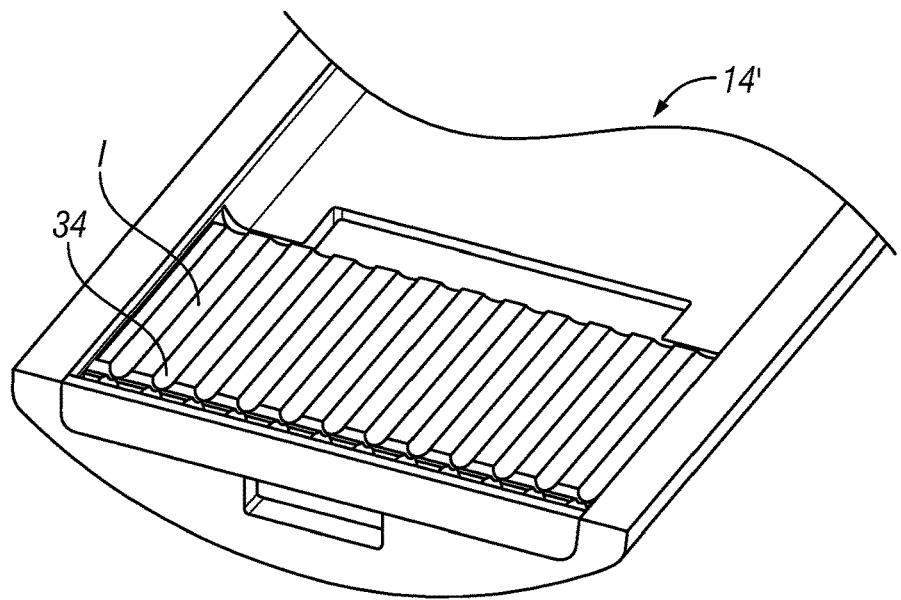
Figure 6D:
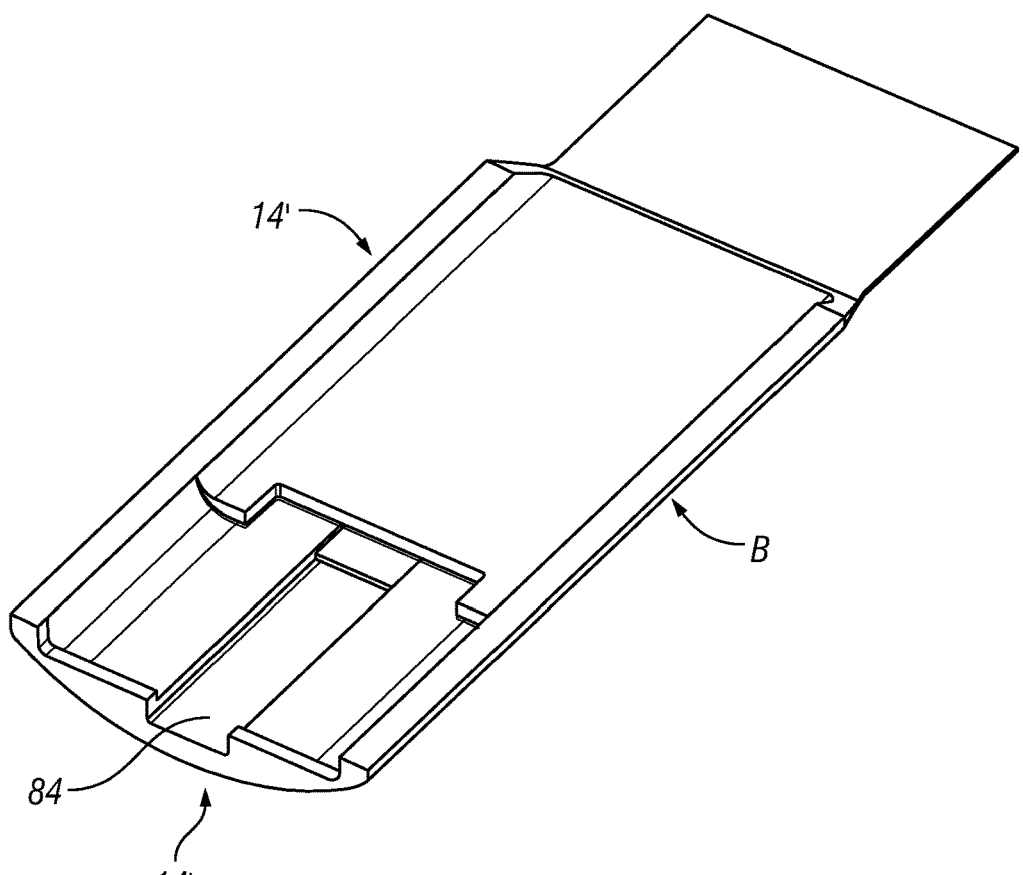
Figure 6E:
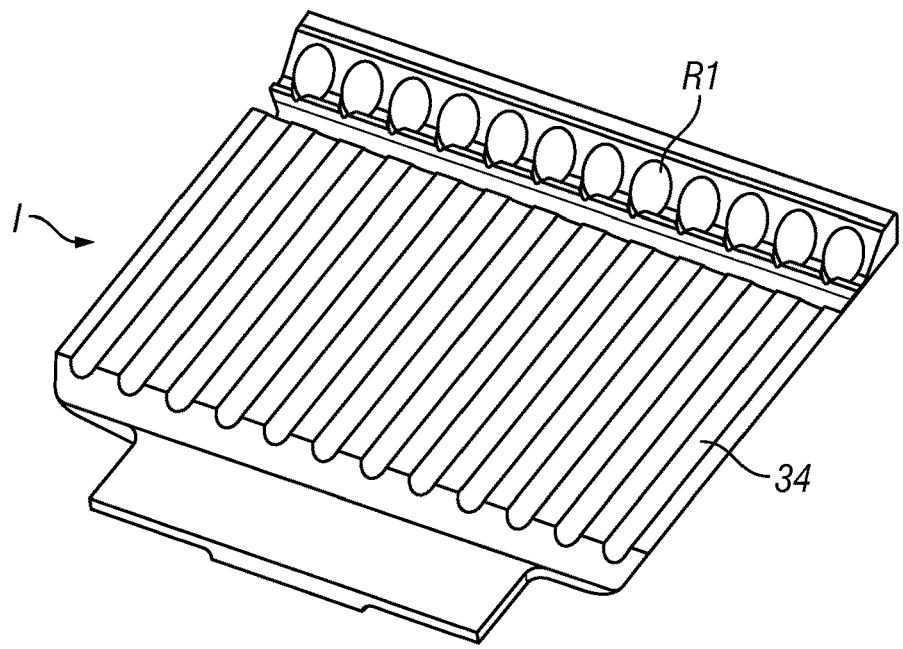
Figure 6F:
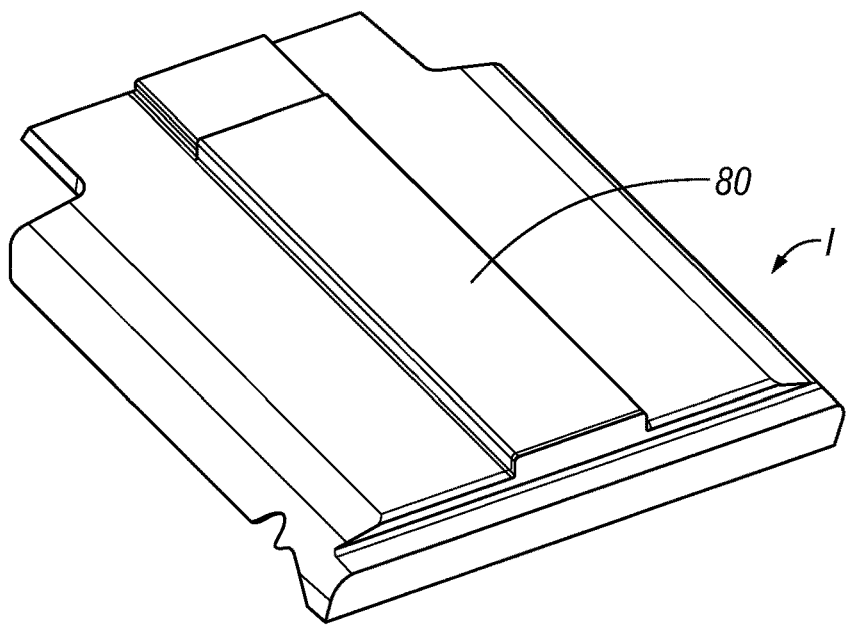

FIGS. 6A-6F illustrate various views of a ferrule half 14' for an optical fiber ferrule assembly 12'. The ferrule half 14' has an insert I having reflective surfaces R1 and fiber alignment grooves 34 (having geometries similar to the earlier embodiments), in accordance with another embodiment of the present invention. In the illustrated embodiment, the insert I is made of a highly reflective material, and the base B of the ferrule halve 14' can be made of stainless steel. Both the base B and insert I are separately preformed (e.g., by stamping), to obtain the separate base B shown in FIG. 6D, and insert I shown in FIGS. 6E and 6F. As shown in FIGS. 6D and 6F, the base B and the insert I are provided with complementary surface features (e.g., a ridge 80 on the back of insert I and a complementary channel 82 in a recess 84 in the base B, for fitting the insert I onto the base B. The pre-formed insert I and the preformed base B are joined, and a final high-precision stamping operation is performed to obtain the overall geometry and alignment among the surface features and between those features to the exterior curved surface of the ferrule halve 14'. This approach allows more intricate surface features to be preformed on the insert I (e.g., the reflective surfaces R1), as it is significantly easier to handle a smaller part for insert I, before attaching and performing a final stamping operation to define the various features in alignment with features on the base B.

Similar insert approach may be applied to form a ferrule halve 13' having reflective surfaces R2 and other features similar to the ferrule halve 13 discussed in earlier embodiments.

FIGS. 7A-7F illustrate various views of an optical fiber ferrule assembly having a rivet insert with reflective surfaces, in accordance with another embodiment of the present invention. In this embodiment, the ferrule 112 includes a ferrule halve 114 having reflective surfaces R1, and a ferrule halve 113 having reflective surfaces R2. The surface features of ferrule halve 113 and 114 are generally similar to those of the ferrule halves 13 and 14 discussed in the earlier embodiments. However, the fiber alignment grooves 134 and 134' and reflective surfaces R1 and R2 are formed by stamping rivet inserts 214 and 213, which may be made of a material different from the material of the bases 314 and 313 of the ferrules 114 and 113, respectively, to form an overall composite structure of dissimilar materials.

Figure 7A:
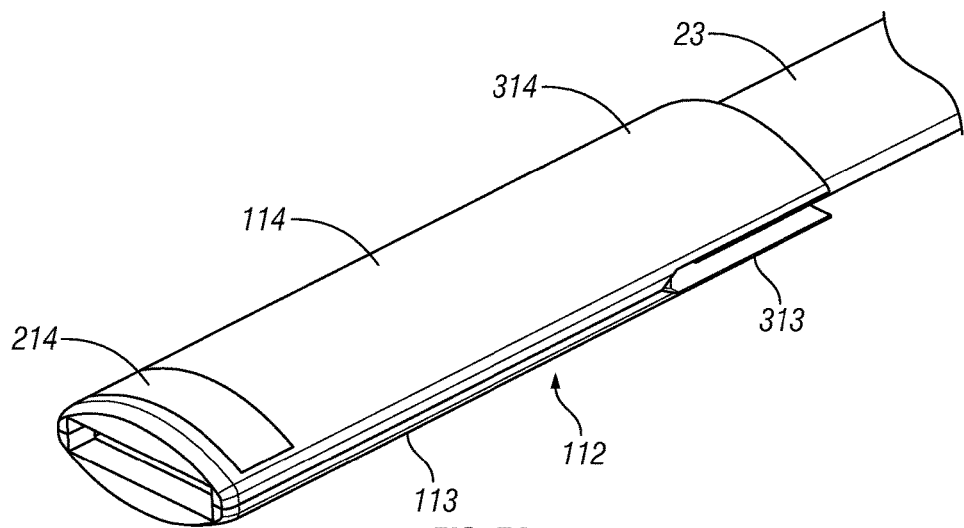
FIGS. 7A-7F illustrate various views of an optical fiber ferrule assembly having a rivet insert with reflective surfaces, in accordance with another embodiment of the present invention.
Figure 7B:
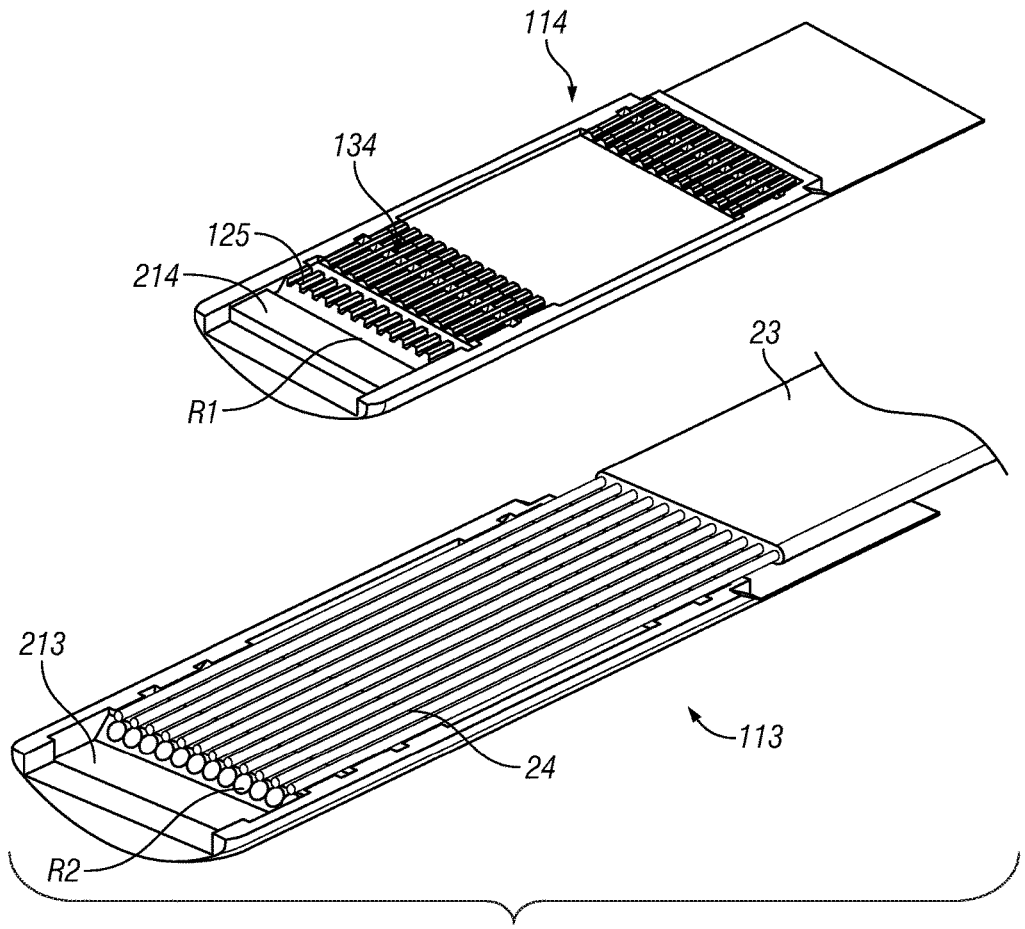
Figure 7C:
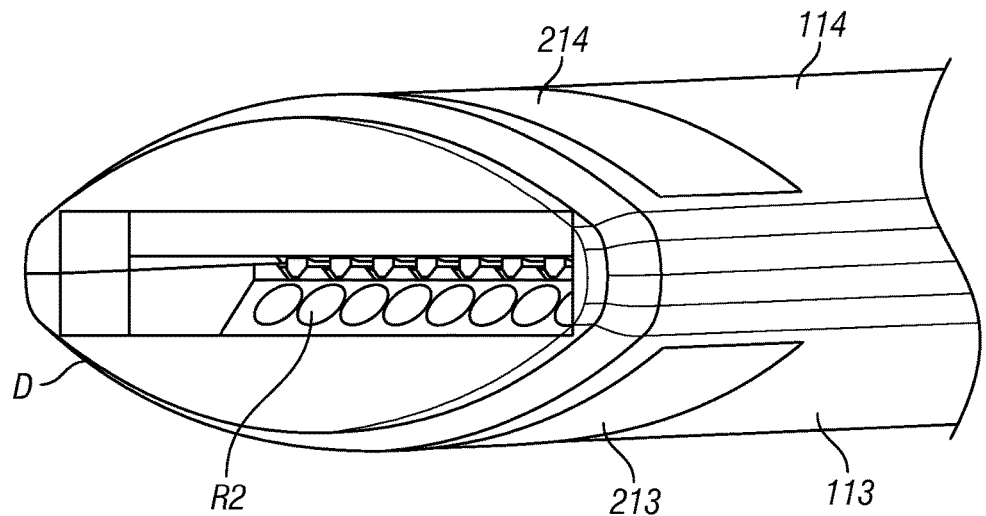
Figure 7D:
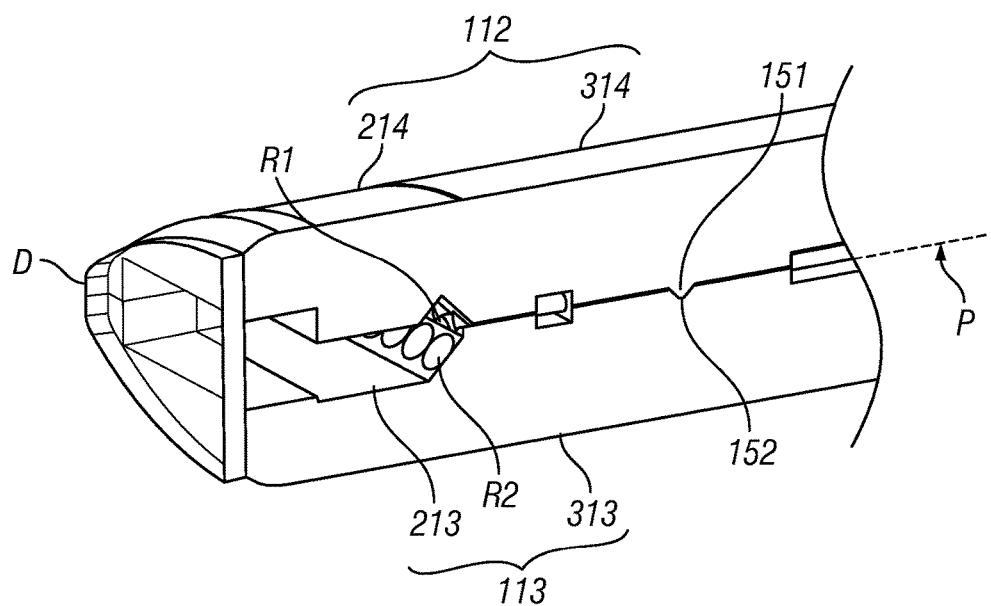
Figure 7E:
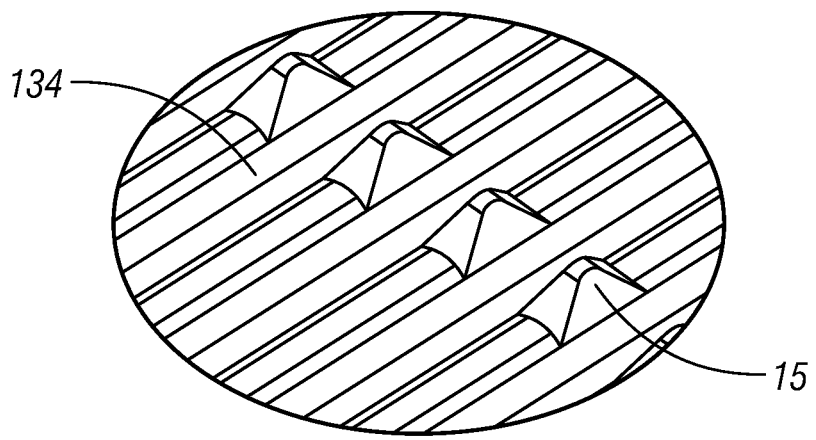
Figure 7F:
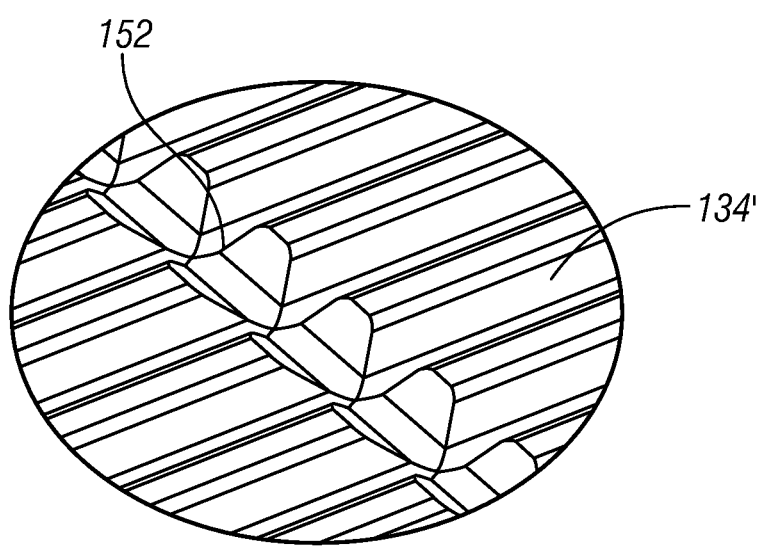

Specifically, for the ferrule halve 114 (similar to ferrule halve 14 in earlier embodiments), the array of reflective surfaces R1, the optical fiber alignment grooves 134 (similar to grooves 34 in earlier embodiments) and the fiber stop 125 (similar to fiber stop 25 in earlier embodiments) are formed by stamping a rivet 214 into a base 314 of the ferrule halve 114. For the ferrule halve 113 (similar to ferrule halve 113 in earlier embodiments), the array of reflective surfaces R2 and the optical fiber alignment grooves 134' (similar to grooves 34' in earlier embodiments) are formed by stamping a rivet 214 into a base 313 of the ferrule halve 113. In this embodiment, additional complementary self-alignment features are provided on the facing surfaces of the inserts 214 and 314. In particular, an array of protrusion 151 are stamped formed in between fiber grooves 134, and an array of complementary slots 151 are stamped formed adjacent fiber grooves 134' in the insert 314 of the ferrule halve 113. As shown in FIG. 7F, the protrusions 151 match up with the slots 151, with the protrusions 151 received in the slots 152.

This "rivet" type stamping approach and its features and benefits are disclosed in U.S. Patent Application Publication No. US2016/0016218A1, which has been commonly assigned to the Assignee of the present invention. Details of such stamping process is not discussed herein, but incorporated by reference herein. The design considerations using this approach discussed therein may be applied to stamp forming the rivet insert herein, and they will not be repeated here.

Figure 8A:
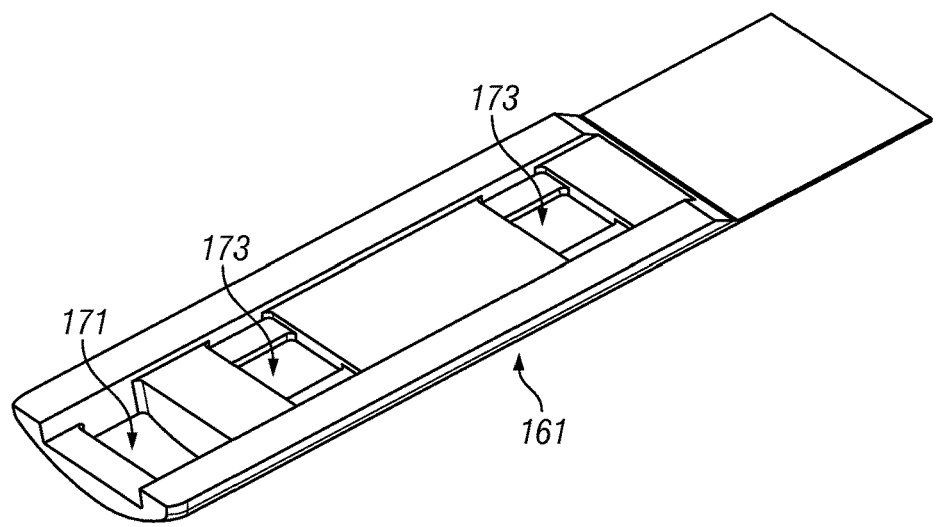
FIGS. 8A-8C illustrate alternate configurations of ferrule halves to accommodate rivet inserts, in accordance with one embodiment of the present invention.
Figure 8B:
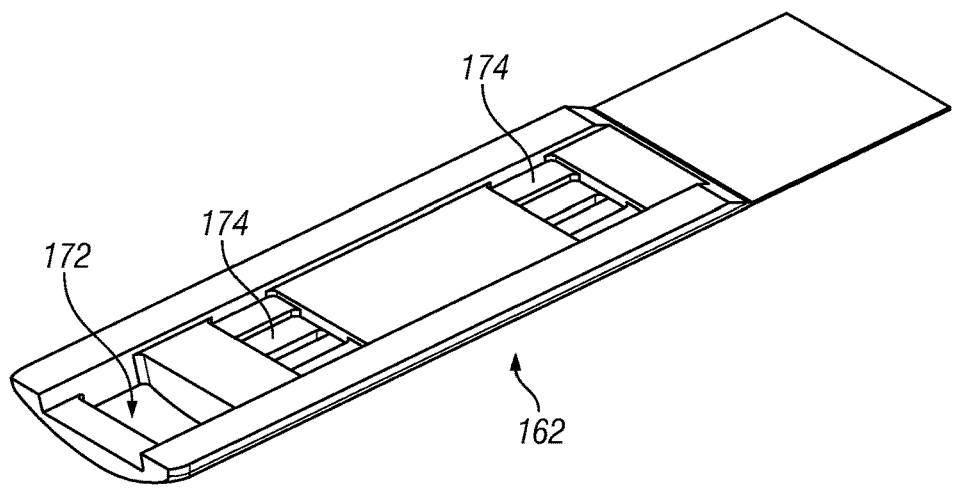
Figure 8C:
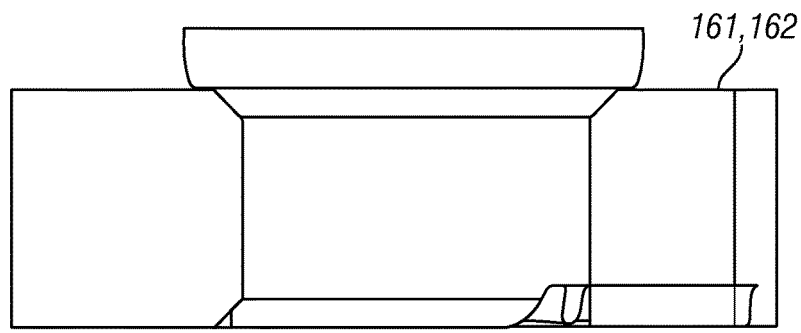
Figure 9A:
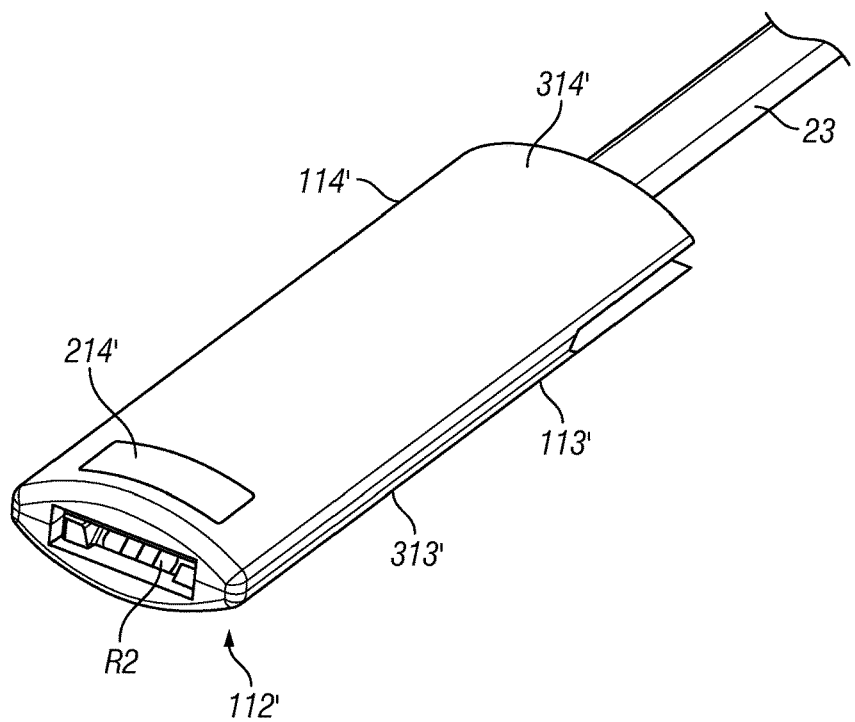
FIGS. 9A-9I illustrate various views of an optical fiber ferrule assembly having rivet inserts with reflective surfaces, in accordance with yet another embodiment of the present invention.
Figure 9B:
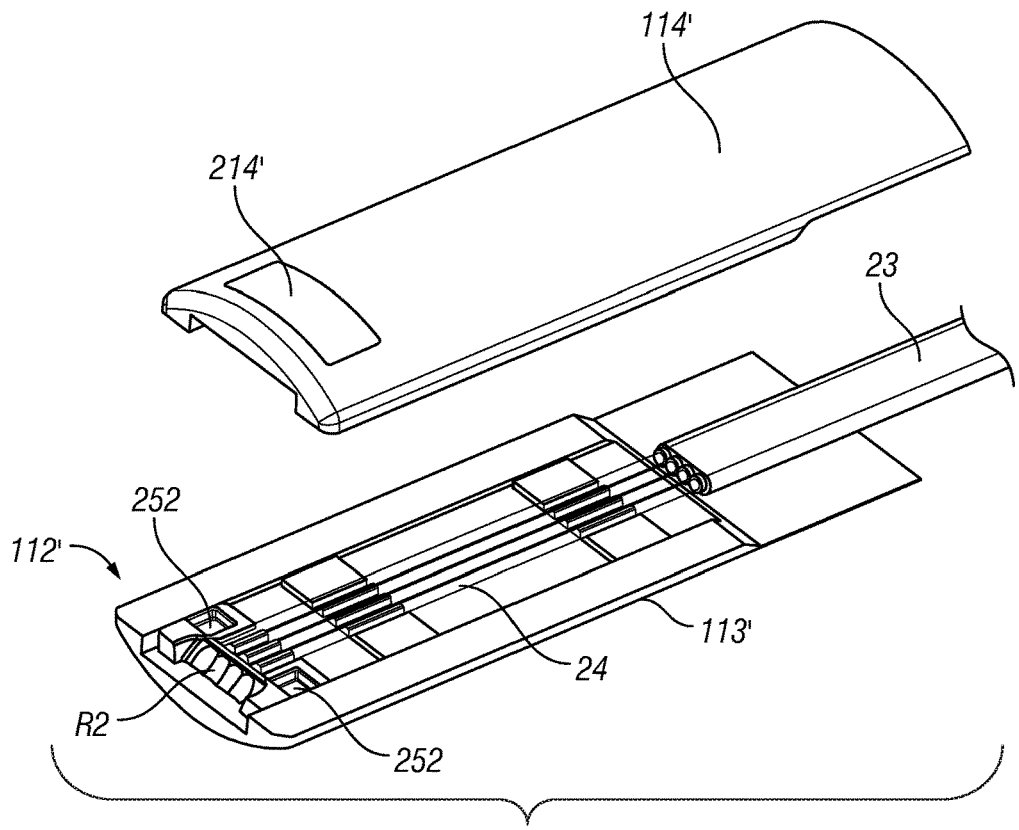
Figure 9C:
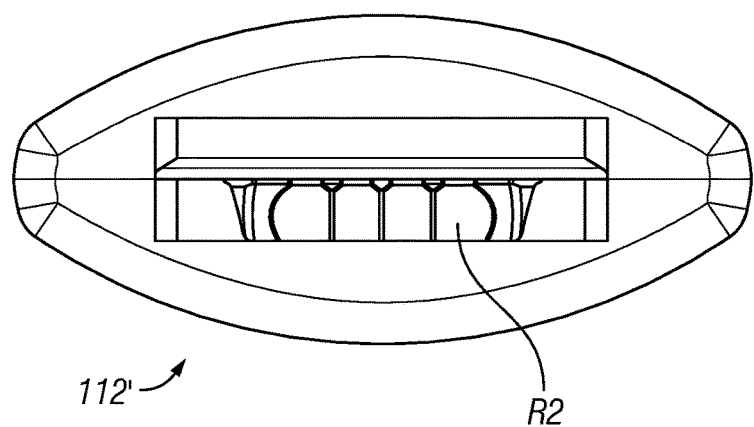
Figure 9D:
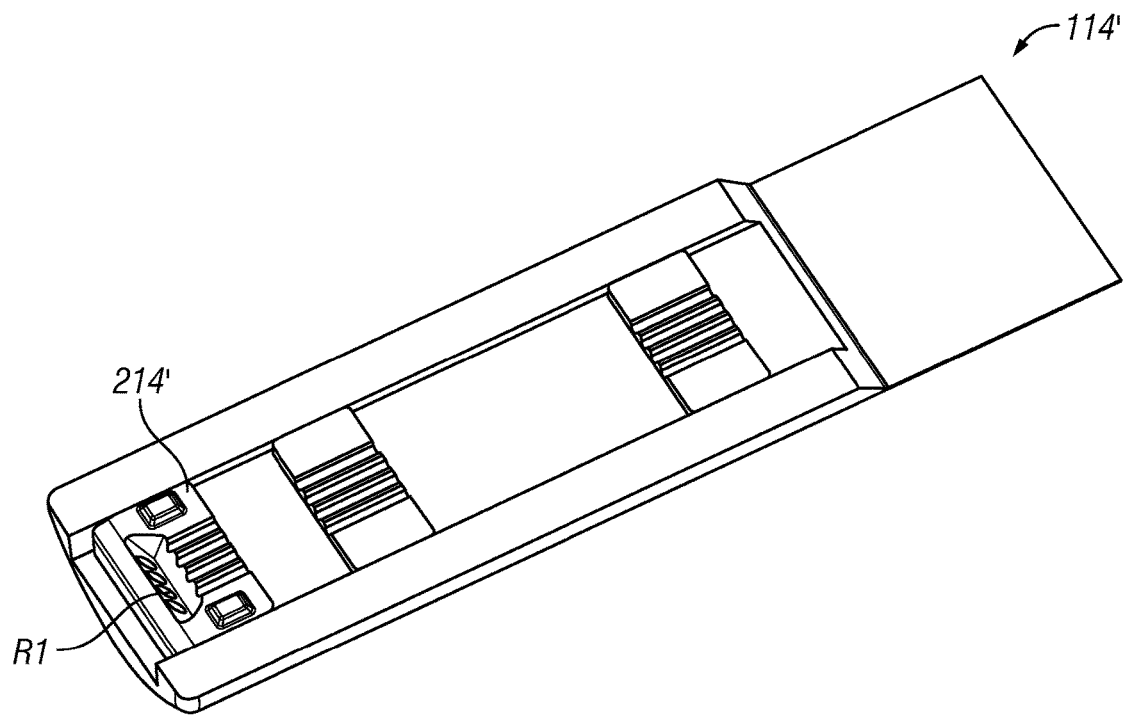
Figure 9E:
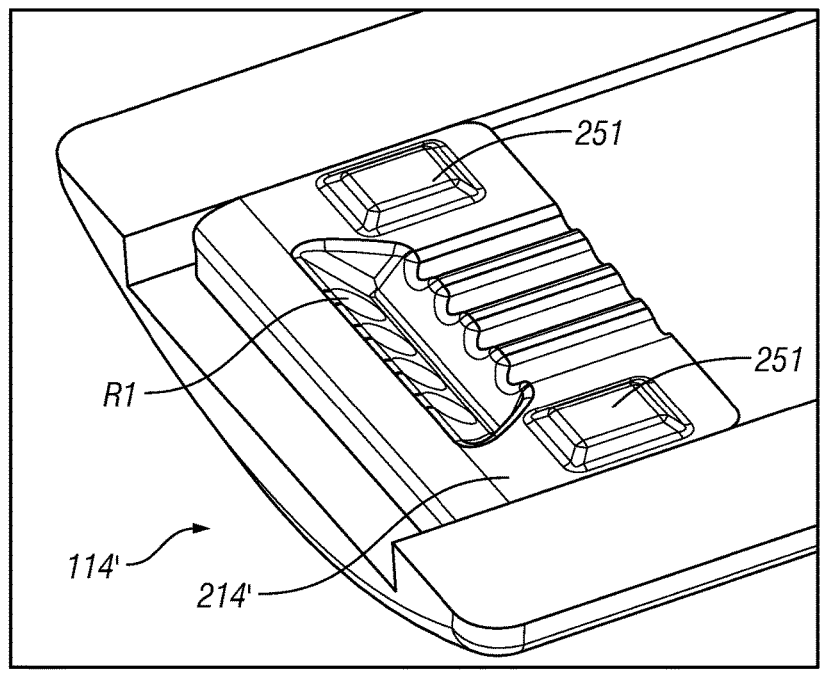
Figure 9F:
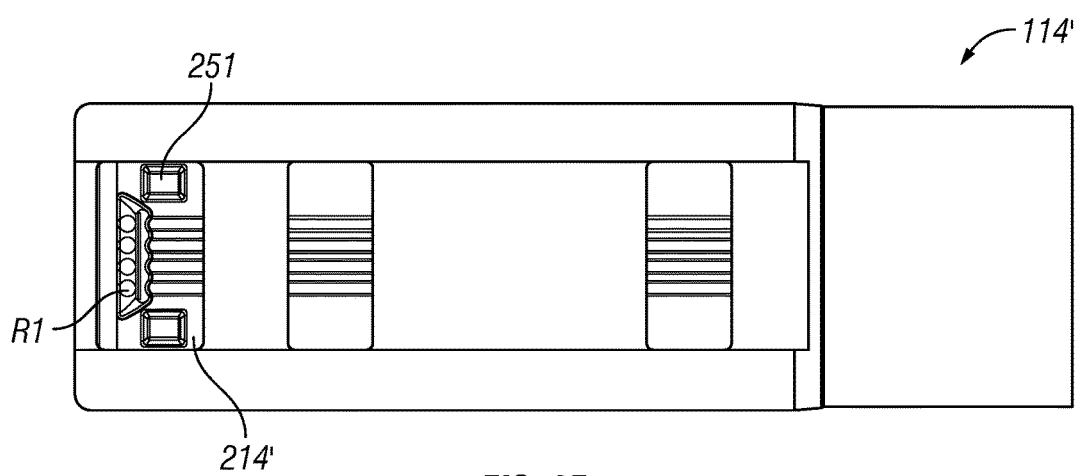
Figure 9G:
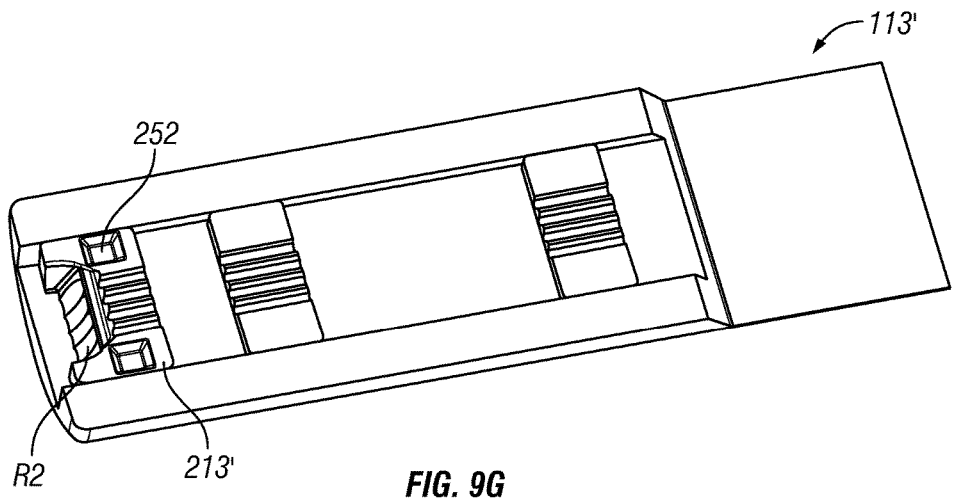
Figure 9H:
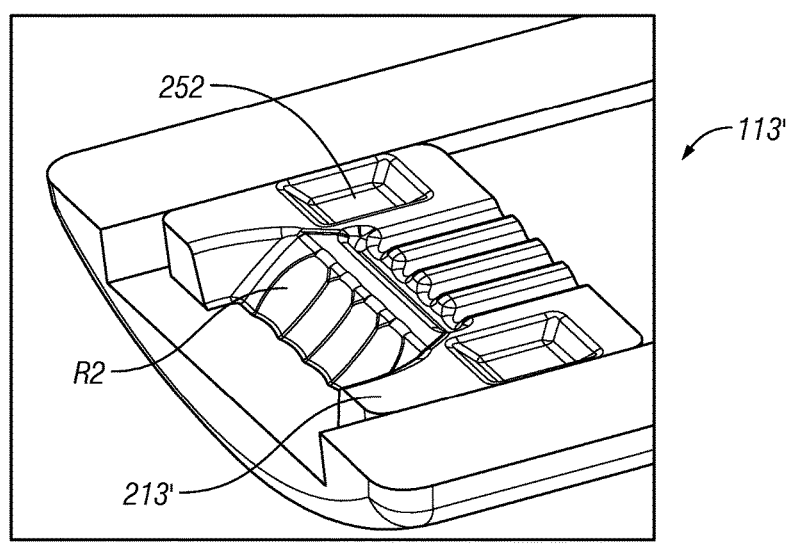
Figure 9I:
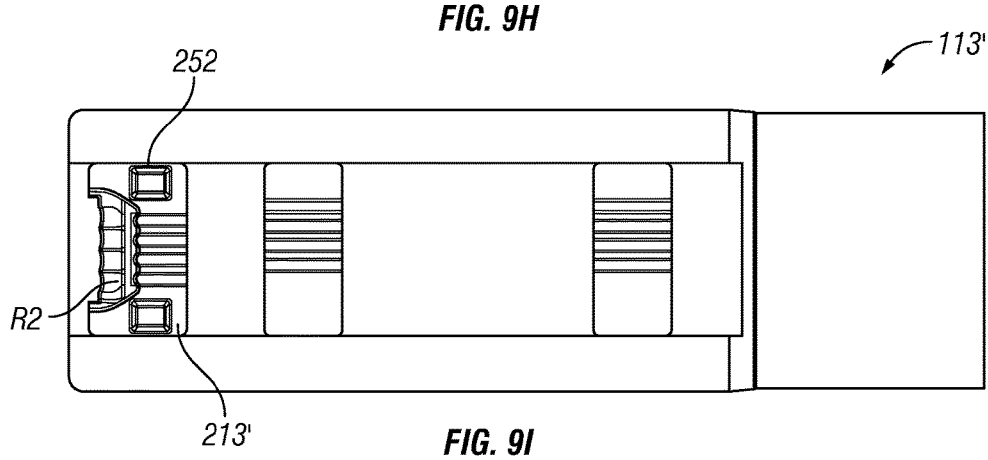

FIGS. 8A-8C illustrate alternate configurations of the bases for ferrule halves to accommodate rivet inserts, in accordance with one embodiment of the present invention. FIGS. 8A and 8B show alternate designs of ferrule halve bases 161 and 162 prior to rivet forming. Through openings 171 and 172 are provided on the bases 161 and 162, to receive rivet inserts into the bases 161 and 162, respectively. Recesses 173 and 174 receive thinner inserts similar to the inserts illustrated in FIG. 6, as appropriate for some type of surface features, or part of the material overflowing from the rivet inserts at the openings 171 and 172.

FIG. 8C is a schematic sectional view illustrating generally a rivet received and partially stamped in a through opening of a base material.

FIGS. 9A-9I illustrate various views of an optical fiber ferrule assembly 112' having rivet inserts with reflective surfaces, in accordance with yet another embodiment of the present invention. In this embodiment, there are less fiber alignment grooves provided, so less optical fiber can be accommodated by the ferrule 112'. This allows more space to stamp axial alignment features in the rivet portions during final stamping operation. In this embodiment, complementary protrusions 251 and alignment pockets 252 are provided on the rivet portions 214' and 213' on the respective ferrule halves 114' and 113'.

Figure 10A:
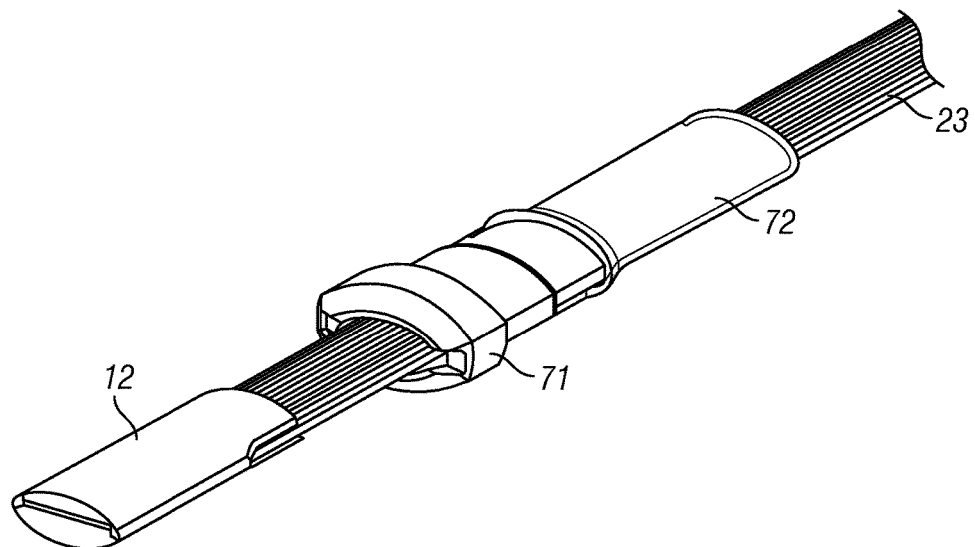
FIGS. 10A-10D illustrate an optical fiber connector incorporating the ferrule assembly in FIG. 3, in accordance with one embodiment of the present invention.
Figure 10B:
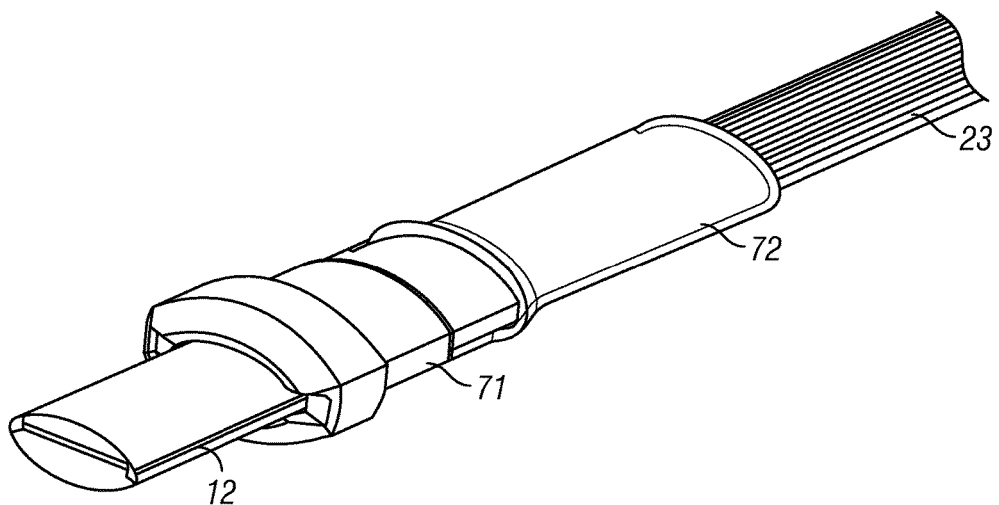
Figure 10C:
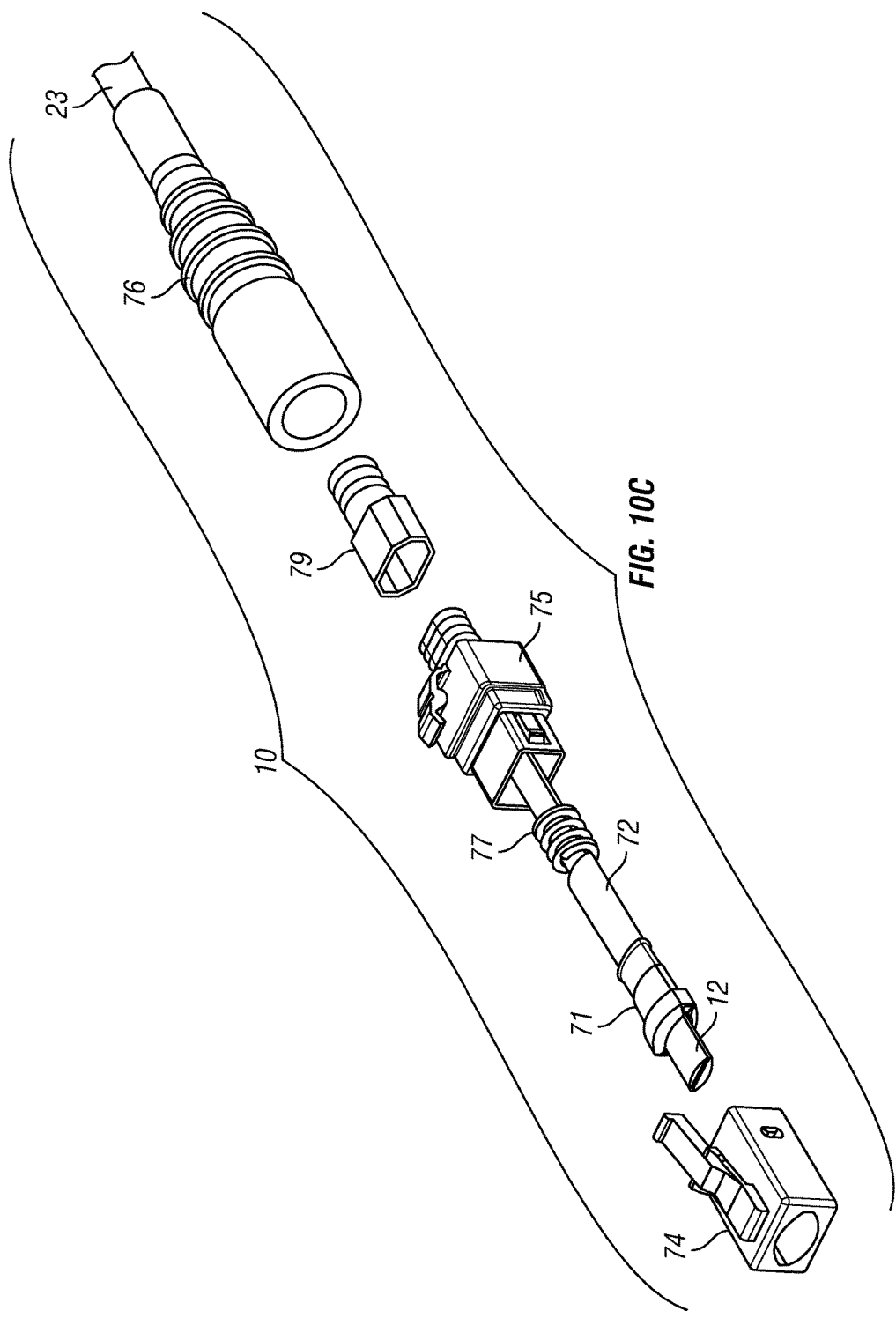
Figure 10D:
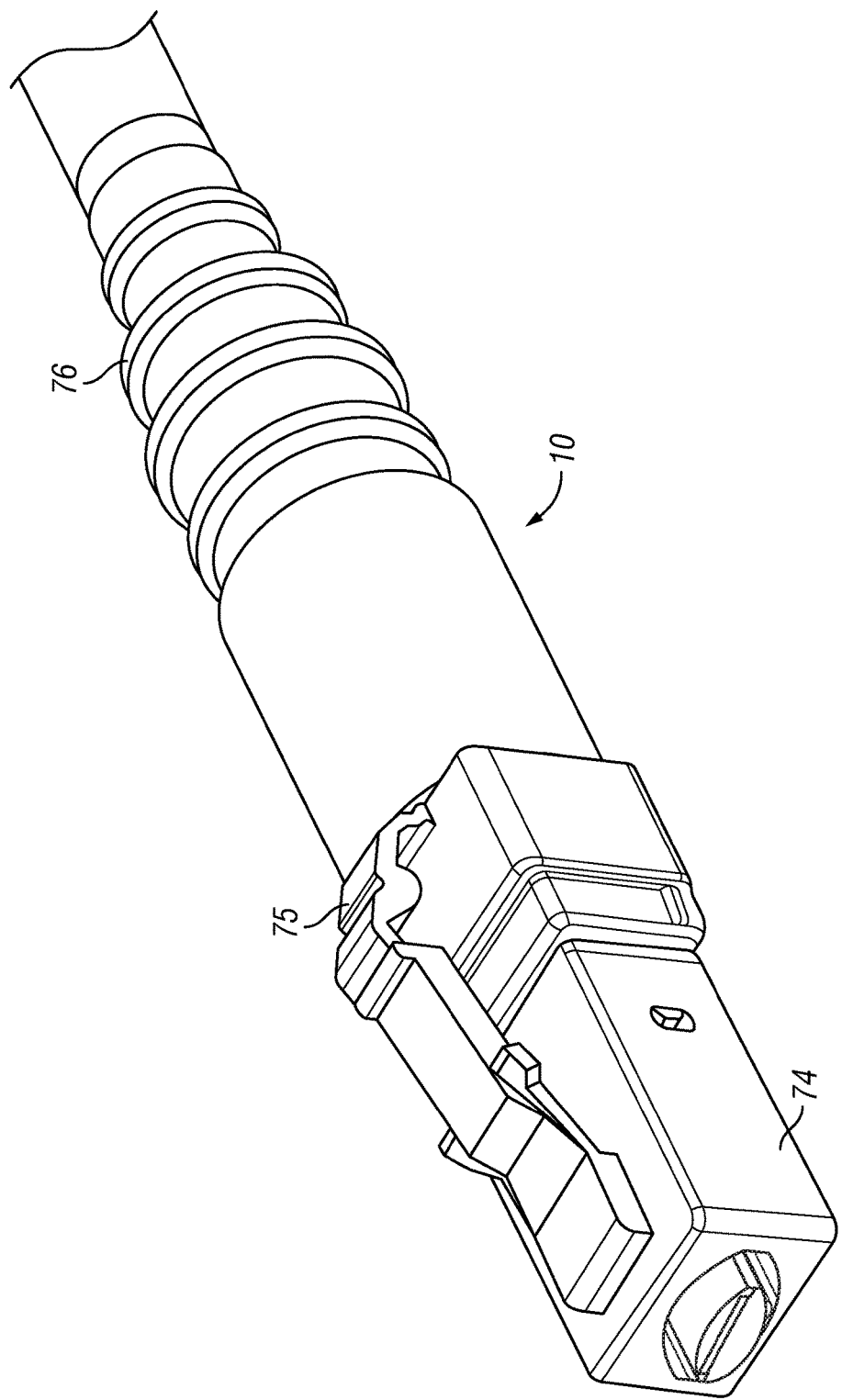

In another aspect of the present invention, the ferrule assembly is incorporated in an optical fiber connector. Referring to FIGS. 10A to 10D, a connector 10 having the form factor of an LC connector housing incorporates the ferrule 12 discussed above. In FIG. 10A, the ferrule 12 is pressed into an opened end of a holder 71, to the form shown in FIG. 10B. A flexible sleeve in the form of a shrink wrap 72 is provided at the other end of the holder 71, through which the fiber ribbon 23 extends. In FIG. 10C, the ferrule 12 is inserted into a ferrule housing 74, and the holder 71 is inserted into a connector housing 75 via a preload spring 77. A crimp 79 holds the holder 71 in place in the connector housing 75. A boot 76 covers the crimped end. FIG. 10D illustrates the completed connector 10. Complementary connectors having similar ferrules may be optically connected using an alignment sleeve 20, similar to the schematic shown in FIGS. 1 and 2.

The ferrule in accordance with the present invention overcomes many of the deficiencies of the prior art, resulting in an optical fiber expanded beam connector with low insertion and return losses, which provides ease of use and high reliability with low environmental sensitivity, and which can be fabricated at low cost.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. An expanded beam ferrule, comprising:
   a first ferrule halve having at least one first reflective surface;
   a second ferrule halve having at least one second reflective surface,
   wherein the first ferrule halve and the second ferrule halve together retain at least one optical fiber,
   wherein the first reflective surface of the first ferrule halve reflects light between the optical fiber and the second reflective surface of the second ferrule halve, and
   wherein the second reflective surface reflects light between the first reflective surface and exterior of the ferrule, wherein input/output of the ferrule is a collimated light parallel to the mid-plane of the ferrule.

2. An expanded beam optical connector, comprising:
   a first and a second expanded beam ferrule each as in claim 1;
   an external alignment sleeve aligns external surfaces of the first and second expanded beam ferrules, with corresponding second reflective surfaces of the first and second expanded beam ferrules facing each other, wherein output light from an optical fiber held in the first expanded beam ferrule is bent twice by the first and second reflective surfaces in the first expanded beam ferrule, with beam divergence after a first bent, and collimation after a second bent, and wherein a collimated light is transmitted to the facing second reflective surface in the facing second expanded beam ferrule aligned by the sleeve, which is subject to optical reshaping in reverse to that undertaken in the first expanded beam ferrule, so as to converge and focus light to input to an optical fiber held in the second expanded beam ferrule.

3. The expanded beam optical connector as in claim 2, wherein the collimated light between the first and second expanded beam ferrules is parallel to the longitudinal axis of the alignment sleeve.

4. The expanded beam optical connector as in claim 2, wherein the first reflective surface is a convex reflective surface, and the second reflective surface is a concave reflective surface.

5. An expanded beam optical connector, comprising:
a first expanded beam ferrule and a second expanded beam ferrule, each expanded beam ferrule comprising:
   a first ferrule halve having first reflective surfaces;
   a second ferrule halve having second reflective surfaces, wherein the first ferrule halve and the second ferrule halve together retain optical fibers;
   wherein a pair of first and second reflective surfaces input/output collimated light parallel to the mid-plane of the respective expanded beam ferrule;
an external alignment sleeve aligns external surfaces of the first and second expanded beam ferrules, with corresponding second reflective surfaces of the first and second expanded beam ferrules facing each other,
wherein output light from an optical fiber held in the first expanded beam ferrule is bent twice by a corresponding pair of first and second reflective surfaces in the first expanded beam ferrule, with beam divergence after a first bent, and collimation after a second bent, and
wherein a collimated light is transmitted to the facing second reflective surface in the facing second expanded beam ferrule aligned by the sleeve, which is subject to optical reshaping in reverse to that undertaken in the first expanded beam ferrule, so as to converge and focus light to input to a corresponding optical fiber held in the second expanded beam ferrule.

6. The expanded beam optical connector as in claim 5, wherein the collimated light between the first and second expanded beam ferrules is parallel to the longitudinal axis of the alignment sleeve.

7. The expanded beam optical connector as in claim 5, wherein the first reflective surfaces are each a convex reflective surface, and the second reflective surfaces are each a concave reflective surface.

8. An expanded beam optical connector, comprising:
a first expanded beam ferrule, comprising:
   a first ferrule halve having at least one first reflective surface;
   a second ferrule halve having at least one second reflective surface,
   wherein the first ferrule halve and the second ferrule halve together retain at least one first optical fiber,
   wherein the first reflective surface of the first ferrule halve reflects incident light from the first optical fiber to the second reflective surface of the second ferrule halve, and
   wherein the second reflective surface output collimated light parallel to the mid-plane of the first expanded beam ferrule; and
a second expanded beam ferrule, comprising:
   a third ferrule halve having at least one third reflective surface;
   a fourth ferrule halve having at least one fourth reflective surface,
   wherein the third ferrule halve and the fourth ferrule halve together retain at least one second optical fiber,
   wherein the fourth reflective surface of the fourth ferrule halve reflects the collimated light output from the first expanded beam ferrule to the third reflective surface of the third ferrule halve, and
   wherein the third reflective surface of the third ferrule halve reflects incident light from the fourth reflective surface of the fourth ferrule halve to the second optical fiber.

9. The expanded beam optical connector as in claim 8, wherein the collimated light between the first and second expanded beam ferrules is parallel to the longitudinal axis of the alignment sleeve.

10. The expanded beam optical connector as in claim 8, wherein the first reflective surface and the third reflective surface are each a convex reflective surface, and the second reflective surface and the fourth reflective surface are each a concave reflective surface.

\* \* \* \* \*